United States Patent
Kida et al.

(10) Patent No.: US 9,436,334 B2
(45) Date of Patent: Sep. 6, 2016

(54) TOUCH PANEL SUBSTRATE WITH FLOATING ELECTRODE PATTERN

(71) Applicant: Sharp Kabushiki Kaisha, Osaka (JP)

(72) Inventors: Kazutoshi Kida, Osaka (JP); Yasuhiro Sugita, Osaka (JP); Shinji Yamagishi, Osaka (JP); Yuhji Yashiro, Osaka (JP); Hiroyuki Ogawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 49 days.

(21) Appl. No.: 14/388,058

(22) PCT Filed: Feb. 20, 2013

(86) PCT No.: PCT/JP2013/054213
§ 371 (c)(1),
(2) Date: Sep. 25, 2014

(87) PCT Pub. No.: WO2013/145958
PCT Pub. Date: Oct. 3, 2013

(65) Prior Publication Data
US 2015/0062457 A1    Mar. 5, 2015

(30) Foreign Application Priority Data

Mar. 26, 2012 (JP) ................................ 2012-070183

(51) Int. Cl.
*G06F 3/044* (2006.01)
*G02F 1/1333* (2006.01)
*G02F 1/1362* (2006.01)
*G06F 3/041* (2006.01)

(52) U.S. Cl.
CPC ........... *G06F 3/044* (2013.01); *G02F 1/13338* (2013.01); *G02F 1/136209* (2013.01); *G06F 3/0412* (2013.01); *G06F 2203/04111* (2013.01)

(58) Field of Classification Search
CPC ................ G06F 3/044; G06F 3/0412; G06F 2203/04111; G02F 1/13338; G02F 1/136209
See application file for complete search history.

(56) References Cited

U.S. PATENT DOCUMENTS

| | | | |
|---|---|---|---|
| 6,452,514 B1 | 9/2002 | Philipp | |
| 2009/0315854 A1 | 12/2009 | Matsuo | |
| 2010/0012939 A1* | 1/2010 | Ishii | G02F 1/136213 257/59 |
| 2010/0141874 A1* | 6/2010 | Morita | G02F 1/133514 349/106 |
| 2010/0316851 A1* | 12/2010 | Hirai | G06F 3/044 428/195.1 |

FOREIGN PATENT DOCUMENTS

JP           2010-2958 A       1/2010

* cited by examiner

*Primary Examiner* — Jimmy H Nguyen
*Assistant Examiner* — Yaron Cohen
(74) *Attorney, Agent, or Firm* — Chen Yoshimura LLP

(57) ABSTRACT

Provided is an in-cell touch panel having improved display quality. An opposite substrate relating to one embodiment of the present invention is provided with a black matrix, first electrodes, which are disposed in the Y direction, and second electrodes, which are disposed in the X direction. The first electrodes and the second electrodes are formed such that the boundaries therebetween are positioned in regions that coincide with the black matrix in a planar view.

13 Claims, 20 Drawing Sheets

(a)

Detection Electrodes (Y Direction)

Driver Electrodes (X Direction)

(b)

(c)

(a)

(b)

(a)

(b)

(a)

(b)

(c)

(d)

(e)

(a)

Equivalent Circuit of Cross-Capacitance

(b)

Equivalent Circuit of Cross-Capacitance (a)

(b)

(a)

(b)

(a)

(b)

(a)

(b)

TOUCH PANEL SUBSTRATE WITH FLOATING ELECTRODE PATTERN

TECHNICAL FIELD

The present invention relates to a touch panel substrate used in an in-cell touch panel, and to a display panel including such a touch panel substrate.

BACKGROUND ART

In recent years, in order to achieve device miniaturization, display devices in which the display unit and the input unit are integrally formed are in wide use. In recent years, in mobile devices such as mobile phones, PDAs (personal digital assistants), and laptop computers, display devices including touch panels that can detect a position of contact when a finger or an input stylus (object to be detected) comes into contact with the display surface are in wide use.

Touch panels of various types such as the conventional so-called resistive film (pressure-sensitive) type and capacitive type are known. Among these, touch panels of the capacitive type are in wide use.

In capacitive touch panels, a position of contact is detected by detecting changes in capacitance when a finger or an input stylus comes into contact with the display surface. Thus, it is possible to detect the position of contact by a simple operation.

Also, in capacitive touch panels, there is no need to provide two conductive films with an air layer therebetween as used in a resistive film touch panel, and thus, no boundary face reflection of external light, which would occur between the air layer and the conductive films, occurs.

However, because capacitive touch panels detect positions of contact by detecting changes in capacitance, if the touch panel receives external noise, there is a possibility that the lines of electric force change due to this noise, which causes the position of contact to not be accurately detected.

Conventionally, as touch panels, out-cell or on-cell type touch panels that are installed outside of the display panel have been widely used.

However, if the touch panel is provided on the outside of the display panel, then when performing touch panel operations while performing display, then the display panel generates radiation noise, which poses the problem of increasing the amount of noise received by the touch panel.

Thus, when providing the touch panel outside of the display panel, the S/N ratio (signal to noise ratio) decreases, which results in the detection accuracy of the touch panel decreasing, thus posing the risk of inaccurate detection of the position of contact.

Also, if the touch panel is provided on the outside of the display panel, then as a result of stacking the touch panel on the display panel, the thickness and weight of the device as a whole increases.

Furthermore, as a result of the touch panel being mounted on the outside of the display panel, external light is reflected not only at the surface of the touch panel but also at the boundary face between the touch panel and the display panel, which has a negative effect on contrast and visibility. Also, due to the touch panel being mounted on the outside of the display panel, the visibility decreases due to the touch panel itself.

In recent years, in-cell touch panels that are built into the cell of the display panel and the like have been developed in order to have a thinner and lighter weight device, to improve visibility, and to attain decreased costs resulting from a decrease in the number of parts due to the touch panel being provided in-cell.

A representative example of a configuration of an in-cell touch panel involves a structure in which so-called sensor electrodes, which are position detection electrodes that detect the position of contact of an object, are provided between an array substrate such as a TFT (thin film transistor) substrate and an opposite substrate such as a CF (color filter) substrate, which constitute an electrooptical device such as a display panel or a display device.

In general, sensor electrodes are light-transmissive electrodes made of ITO (indium tin oxide) or the like. In order to make the detection of a position of contact possible, the touch panel is provided with light-transmissive electrode patterns that extend in the column direction and light-transmissive electrode patterns that extend in the row direction, intersecting with the column direction electrode patterns.

However, transmittance and reflectance differ between regions where the light-transmissive electrode patterns are formed and where the light-transmissive electrode patterns are not formed, and thus, there is a problem that the light-transmissive electrode patterns are visible.

Patent Document 1 discloses a configuration in which dummy patterns made of a light-transmissive film having an index of refraction equal to that of ITO is provided in the gaps between the first and second light-transmissive electrode patterns (sensor electrodes) made of ITO. The configuration of Patent Document 1 narrows the area where none of the first light-transmissive electrode patterns, second light-transmissive electrode patterns, and dummy patterns are present, which causes the first and second light-transmissive electrode patterns to not be easily seen.

RELATED ART DOCUMENTS

Patent Documents

Patent Document 1: Japanese Patent Application Laid-Open Publication, "Japanese Patent Application Laid-Open Publication No. 2010-2958 (Published on Jan. 7, 2010)"

Patent Document 2: U.S. Pat. No. 6,452,514 (issued Sep. 17, 2002)

SUMMARY OF THE INVENTION

Problems to be Solved by the Invention

However, in the conventional configuration above, the gap between the light-transmissive electrode patterns and the dummy patterns is not completely eliminated, and there are still areas where neither the light-transmissive electrode patterns nor dummy patterns are present. Thus, a contrast difference occurs at the boundaries between the light-transmissive electrode patterns and the dummy patterns. Thus, it is not possible to solve the core problem of the patterns being visible. Also, in the configuration of Patent Document 1, in the intersections between light-transmissive electrode patterns extending in the row direction and light-transmissive electrode patterns extending in the column direction, in order to connect one set of light-transmissive electrode patterns to each other, light-transmissive relay electrodes are formed over a light-transmissive interlayer insulating film. The transmittance differs between the interlayer insulating film and the light-transmissive conductive material, and thus, the transmittance of the intersections where the relay electrodes are formed differs from the transmittance of other areas, and thus, the patterns become visible. This reduces display quality of images.

The present invention takes into consideration this situation, and according to one aspect of the present invention, it is possible to attain a touch panel substrate used in an in-cell touch panel with improved display quality, a display panel and display device including this.

Means for Solving the Problems

A touch panel substrate according to one aspect of the present invention is a capacitive touch panel substrate for use as one of a pair of substrates included in a display panel, the touch panel substrate including:

a substrate;

a black matrix formed over the substrate in a grid pattern to correspond to respective pixels;

a plurality of first transmissive electrodes arranged over the substrate in a first direction and electrically connected to each other; and a plurality of second transmissive electrodes arranged over the substrate in a second direction that intersects with the first direction and electrically connected to each other, wherein edges of the first transmissive electrodes are positioned in an area coinciding with the black matrix when the touch panel substrate is viewed in a plan view, and wherein edges of the second transmissive electrodes are positioned in an area coinciding with the black matrix when the touch panel substrate is viewed in a plan view.

Effects of the Invention

A touch panel substrate according to one aspect of the present invention includes: a substrate; a black matrix formed over the substrate in a grid pattern to correspond to respective pixels; a plurality of first transmissive electrodes arranged over the substrate in a first direction and electrically connected to each other; and a plurality of second transmissive electrodes arranged over the substrate in a second direction that intersects with the first direction and electrically connected to each other, wherein edges of the first transmissive electrodes are positioned in an area coinciding with the black matrix when the touch panel substrate is viewed in a plan view, and wherein edges of the second transmissive electrodes are positioned in an area coinciding with the black matrix when the touch panel substrate is viewed in a plan view.

The boundaries between the first light-transmissive electrodes and the second light-transmissive electrodes are located in areas coinciding with the black matrix. Thus, it is possible to prevent the boundaries between the first light-transmissive electrodes and the second light-transmissive electrodes to be seen by a viewer. Thus, it is possible to provide a touch panel substrate used in an in-cell touch panel by which it is possible to improve display quality, and a display panel and display device including this.

DETAILED DESCRIPTION OF EMBODIMENTS

Embodiment 1

A display device having a touch panel function according to one embodiment of the present invention (hereinafter referred to as the display device) will be described below.

(Configuration of Display Device)

Figure 1:
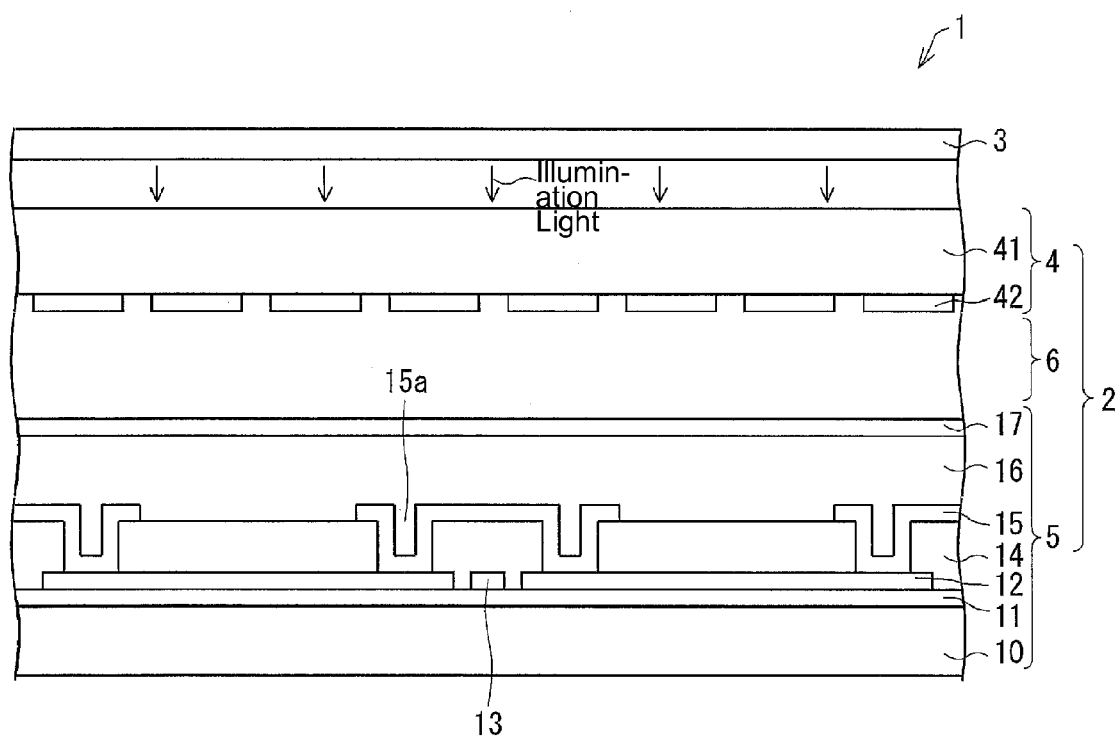
FIG. 1 is a cross-sectional view of a schematic configuration of a display device of one embodiment of the present invention.

FIG. 1 is a cross-sectional view of a schematic configuration of a display device of the present embodiment. The display device 1 shown in FIG. 1 includes a display panel 2 that combines the normal image display function with a capacitive touch panel function, various driver circuits (data signal line driver circuit, scan signal line driver circuit, etc.; not shown) that drive the display panel 2, and a backlight 3 that radiates light on the display panel 2.

The display panel 2 is an active matrix-type liquid crystal display panel in which a liquid crystal layer 6 (electrooptical element) is sandwiched between a pair of substrates that face each other (active matrix substrate 4 and opposite substrate 5 (color filter (CF) substrate)). In the display panel 2, the opposite substrate 5 side is the viewer side, and a backlight 3 is disposed to the rear of the active matrix substrate 4.

The active matrix substrate 4 is provided with various types of signal lines (not shown) such as scan signal lines and data signal lines, transistors (TFTs) (not shown), and pixel electrodes 42 corresponding to pixels arranged in a matrix on a glass substrate 41. A known configuration can be applied to the active matrix substrate 4.

The opposite substrate 5 has, in addition to a configuration for the image display function, a configuration for a touch panel function. Below, a specific configuration example of an opposite substrate 5 (touch panel substrate) having a touch panel function will be mainly described.

The opposite substrate 5 is constituted of a glass substrate 10, a black matrix 11 (BM), first electrodes 12 (first light-transmissive electrodes) and second electrodes 13 (second light transmissive electrodes), a first insulating layer 14, bridge wiring lines 15 (first light-shielding wiring lines), a second insulating layer 16, and opposite electrode 17 (common electrode), and an alignment film (not shown), and these members are layered in this order.

The black matrix 11 is a light-shielding member formed in a grid pattern so as to correspond to the respective pixels, and divides the color filters of the respective pixels and respective colors to be arranged in a matrix. The black matrix 11 is made of a light-shielding resin, for example.

The first electrodes 12 and the second electrodes 13, which are position detection electrodes, are transparent electrodes, and are made of a transparent conductive material such as an oxide. Examples of the transparent conductive material include ITO (indium tin oxide), IZO (indium zinc oxide), zinc oxide, and tin oxide, for example.

The first electrodes 12 and the second electrodes 13 may be transparent electrodes having a transparent state by being thin, examples of which include a metal thin film electrode or a thin carbon electrode made of graphene or the like. There is a tradeoff between transmittance and energy consumed by the backlight 3, and thus, it is preferable that the first electrodes 12 and the second electrodes 13 have a transmittance of 70% or greater.

The first electrodes 12 and the second electrodes 13 are formed in the same layer as each other. It is more preferable that the first electrodes 12 and the second electrodes 13 be formed in the same plane. The capacitive touch panel function is realized by both of these electrodes.

The first insulating layer 14 and the second insulating layer 16 are made of transparent insulating materials.

The bridge wiring lines 15 are formed in a layer different from the layer where the first electrodes 12 and the second electrodes 13 are formed. The bridge wiring lines 15 are electrically connected to the plurality of first electrodes 12 through contact sections 15 (contact holes). The bridge wiring lines 15 electrically connect adjacent first electrodes 12. In the present embodiment, the bridge wiring lines 15 are formed of a low resistance conductive metal wiring line (such as Al, for example), but can also be formed of a transparent conductor.

The opposite electrode 17 is made of a transparent conductive material similar to the pixel electrodes or the position detection electrodes.

(Operational Principles of Touch Panel)

Operational principles of the capacitive touch panel will be described with reference to FIG. 2.

Figure 2:
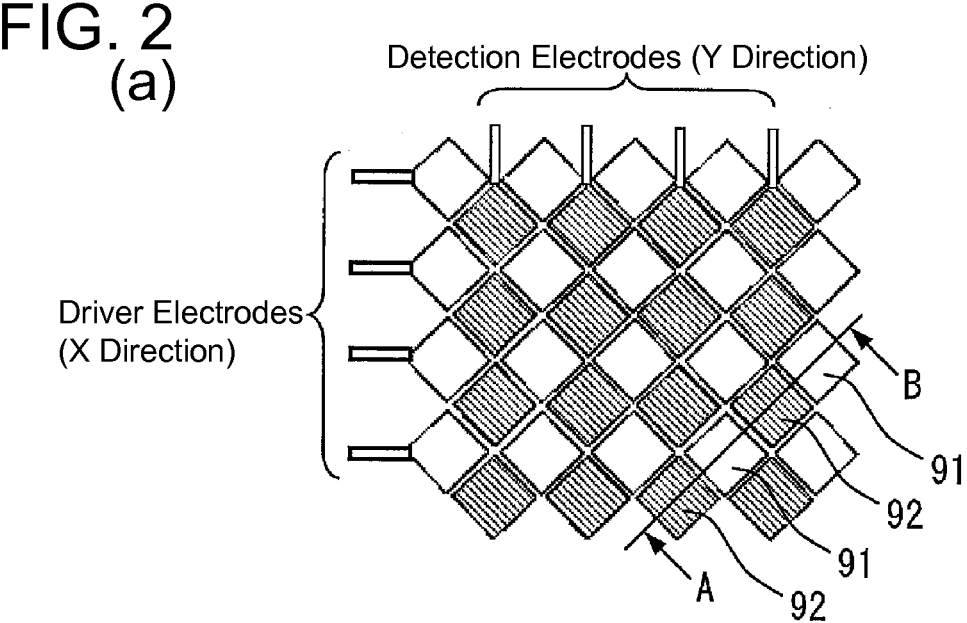
FIG. 2(a) is a plan view for describing an electrode configuration of a touch panel.
FIG. 2(b) is a cross-sectional view of FIG. 2(a) along the line A-B.
FIG. 2(c) is a drawing for describing an operation of the touch panel when a finger (object to be detected) touches the touch panel.
Figure 2:
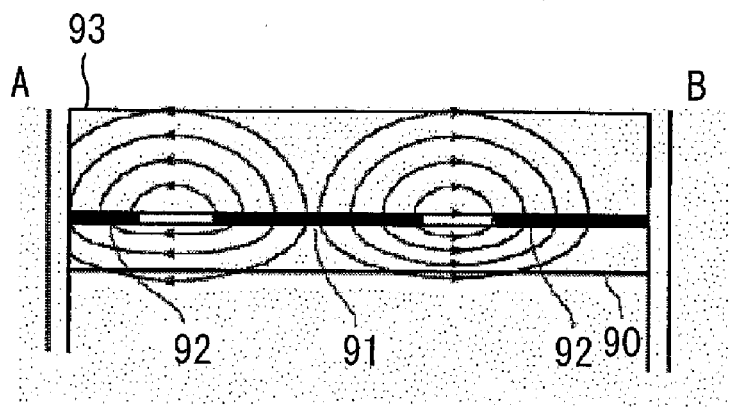
Figure 2:
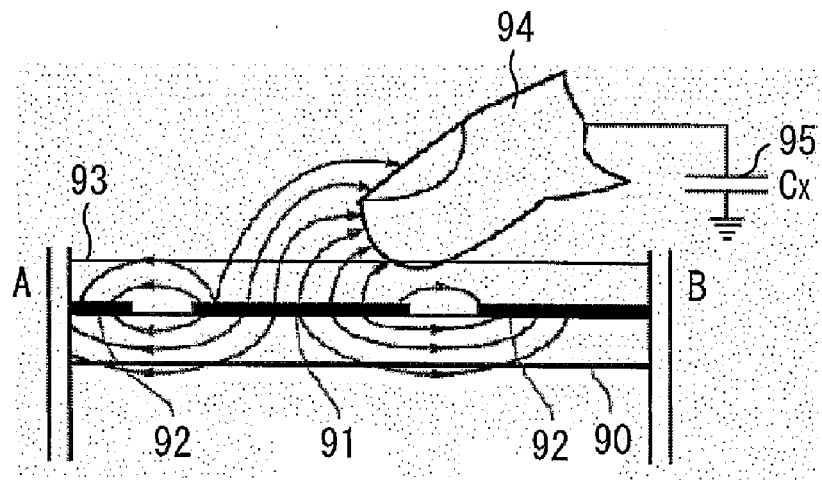

FIG. 2 shows an example of a capacitive touch panel. FIG. 2(a) is a plan view for describing the electrode configuration of the touch panel, FIG. 2(b) is a cross-sectional view of FIG. 2(a) along the line A-B, and FIG. 2(c) is a drawing for describing the operation of the touch panel when a finger (object to be detected) touches the touch panel.

In FIG. 2, the reference character 90 refers to a substrate made of a transparent insulator (dielectric body), and a plurality of driving electrodes 91 and a plurality of detection electrodes 92 are provided on the substrate 90. A cover glass 93 is provided to cover the surface on which the driving electrodes 91 and the detection electrodes 92 are provided. The cover glass 93 is made of an insulator having a prescribed permittivity such as transparent glass.

In FIG. 2(a), a detailed configuration for connection is not shown, but the plurality of driving electrodes 91 are connected to each other in the X direction in each row, and the plurality of detection electrodes 92 are connected to each other in the Y direction in each column. As shown in FIG. 2(b), when a drive voltage is applied between the driving electrodes 91 and the detection electrodes 92, a capacitance is formed between the driving electrodes 91 and the detection electrodes 92 through the substrate 90 and the cover glass 93, and lines of electric force are formed as shown. The driving electrodes 91 and the detection electrodes 92 are electrically coupled through this capacitance (cross capacitance).

In this state, as shown in FIG. 2(c), when a fingertip 94 touches the surface of the cover glass 93, a capacitance 95 is formed with ground through the human body, and thus, some of the lines of electric force are grounded through the fingertip 94. This indicates that in the portion that the fingertip 94 touched, a great change in capacitance between the driving electrodes 91 and the detection electrodes 92 has occurred. By applying a prescribed pulse to the driving electrodes 91 and measuring the response of the detection electrodes 92, for example, it is possible to detect changes in capacitance, thereby being able to detect the position where the fingertip 94 has come into contact.

In the present embodiment, the position detection circuit for detecting the coordinate position of an object to be detected can be a known circuit (see Patent Document 2, for example), and there is no special limitation for this.

(Configuration of Position Detection Electrodes)

Figure 3:
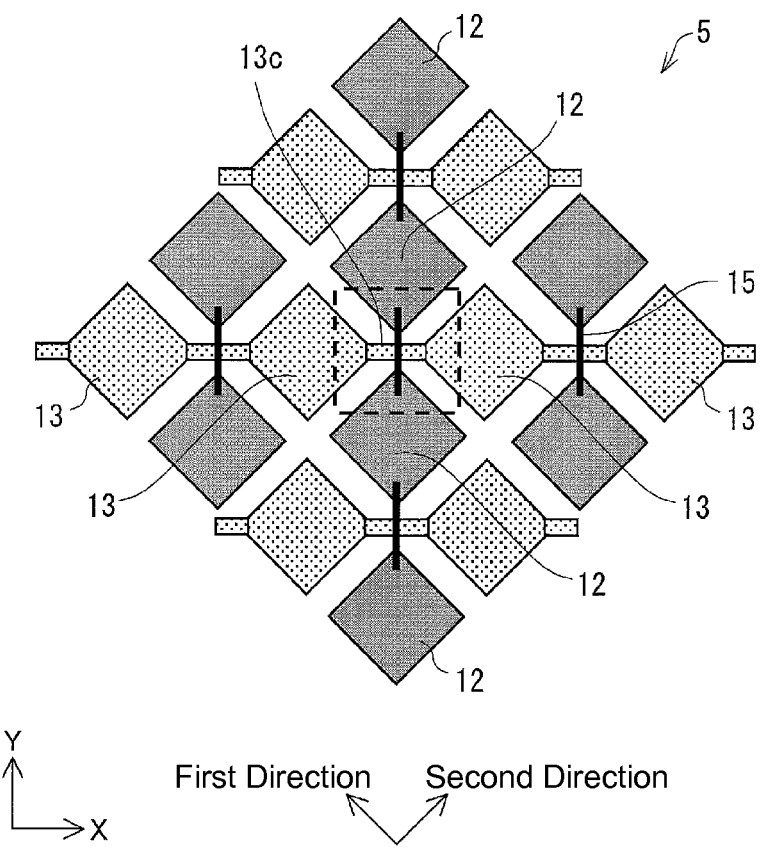
FIG. 3 is a plan view showing a schematic configuration of first electrodes and second electrodes, which are position detection electrodes of a display panel of the display device.

FIG. 3 is a plan view showing a schematic configuration of first electrodes and second electrodes, which are position detection electrodes of a display panel of the present embodiment. The plurality of first electrodes 12 are arranged in the Y direction and the plurality of second electrodes 13 are arranged in the X direction. Both types of electrodes (12 and 13) are arranged alternately in a diagonal first direction and second direction. Also, the plurality of second electrodes 13 arranged in the X direction are electrically connected to each other through transparent relay electrodes 13c (connecting wiring lines) formed in the same layer therewith. The plurality of first electrodes 12 arranged in the Y direction are electrically connected to each other through bridge wiring lines 15 formed in a different layer therefrom. In FIG. 3, the shape of the first electrodes 12 and the second electrodes 13 is overall rectangular (square, for example), but the shape is not limited thereto. There is no conduction between the first electrodes 12 and the second electrodes 13, and capacitance is formed therebetween. In the present embodiment, either the first electrodes 12 or the second electrodes 13 function as driving electrodes, the other functioning as detection electrodes.

Figure 4:
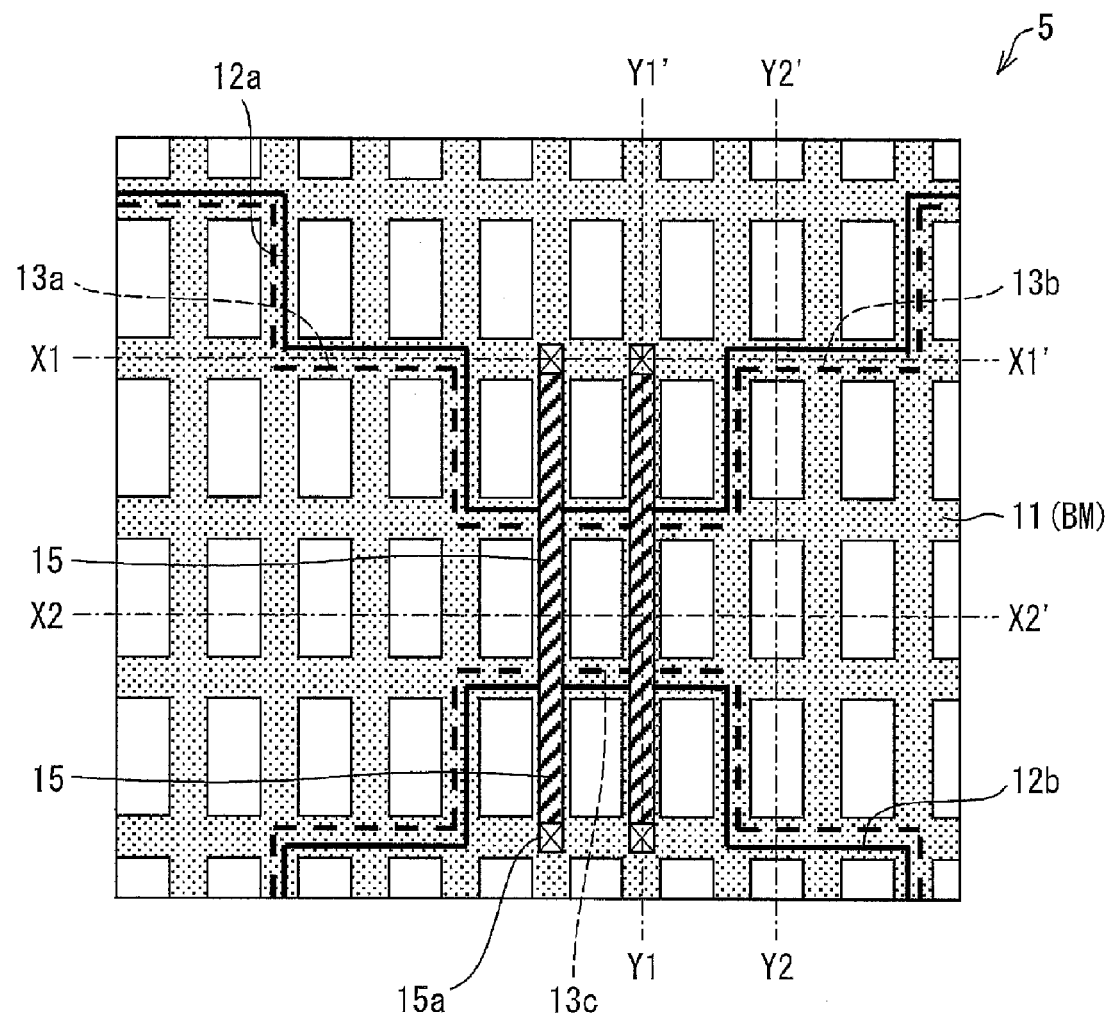
FIG. 4 is a plan view showing a configuration of the first electrodes and the second electrodes when viewing an opposite substrate of the display panel from the opposite electrode side.

FIG. 4 is a plan view showing a configuration of the first electrodes and the second electrodes when viewing the opposite substrate 5 from the opposite electrode side. FIG. 4 shows a magnified view of the area in FIG. 3 surrounded by the dotted line. FIG. 4 shows adjacent two first electrodes 12a and 12b, adjacent two second electrodes 13a and 13b, a bridge wiring line 15, and the black matrix 11.

Figure 5:
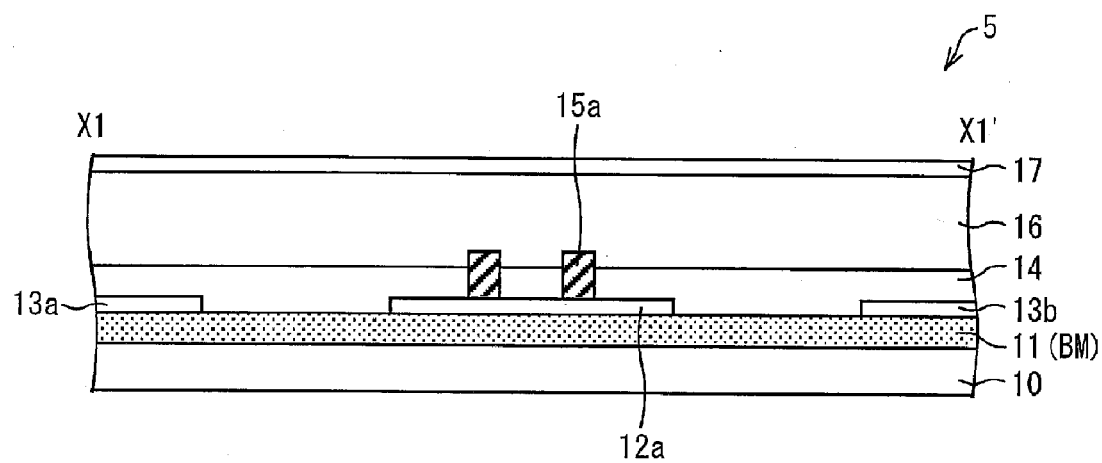
FIG. 5(a) is a cross-sectional view of FIG. 4 along the line X1-X1' and FIG. 5(b) is a cross-sectional view of FIG. 4 along the line X2-X2'.
Figure 5:
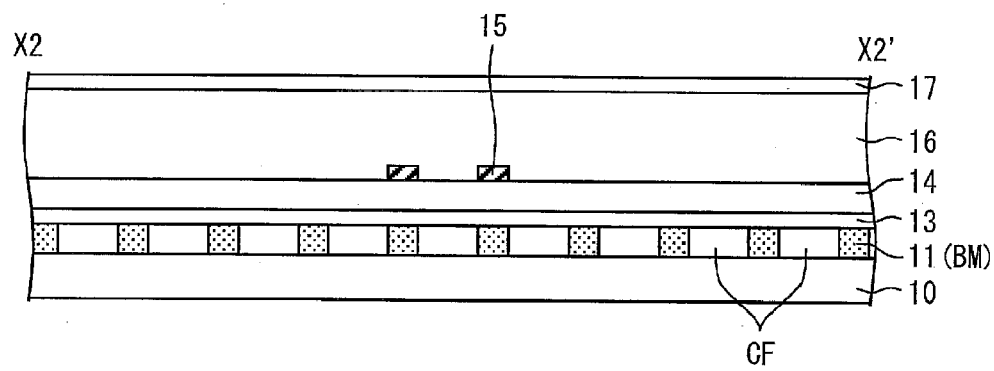
Figure 6:
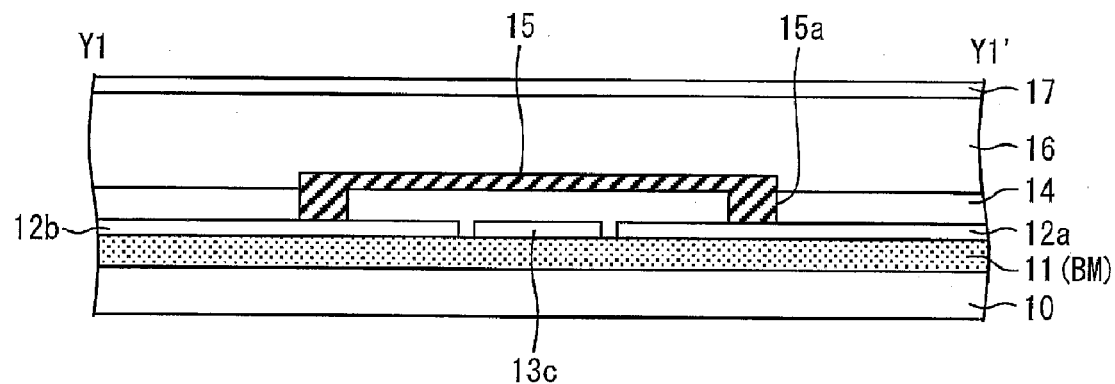
FIG. 6(a) is a cross-sectional view of FIG. 4 along the line Y1-Y1' and FIG. 6(b) is a cross-sectional view of FIG. 4 along the line Y2-Y2'.
Figure 6:
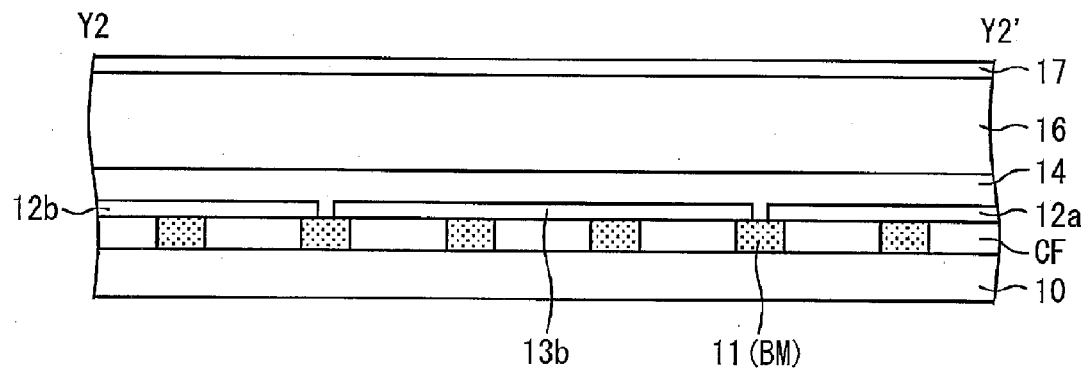

FIG. 5(a) is a cross-sectional view of FIG. 4 along the line X1-X1', and FIG. 5(b) is a cross-sectional view of FIG. 4 along the line X2-X2'. FIG. 6(a) is a cross-sectional view of FIG. 4 along the line Y1-Y1', and FIG. 6(b) is a cross-sectional view of FIG. 4 along the line Y2-Y2'.

A second electrode 13a and a second electrode 13b are electrically connected to each other through the relay electrode 13c formed in the same layer therewith. A first electrode 12a and a first electrode 12b are electrically connected to each other through the bridge wiring line 15 formed in a different layer therefrom.

The black matrix 11 is formed in a grid pattern so as to separate color filters CF of the respective colors (RGB) corresponding to the respective pixels. The areas surrounded by the black matrix 11 are display areas corresponding to the respective pixels. The first electrodes 12a and 12b and the second electrodes 13a and 13b are formed such that boundaries therebetween coincide with the black matrix 11 in a plan view. In other words, the first electrodes 12a and 12b and the second electrodes 13a and 13b respectively have edges formed along the grid pattern of the black matrix 11. The boundaries between the first electrodes 12a and 12b and the second electrodes 13a and 13b are included within the area where the black matrix 11 is formed without protruding to areas where the black matrix 11 is not formed.

The bridge wiring lines 15 are formed between the first electrode 12a and the first electrode 12b in areas coinciding with the black matrix 11 and along the black matrix 11. The contact sections 15a of the bridge wiring lines 15 are formed within areas corresponding to the black matrix 11. The bridge wiring lines 15 and the contact sections 15a are also formed in areas where the black matrix 11 is formed without protruding outside of the area where the black matrix 11 is formed.

Figure 7:
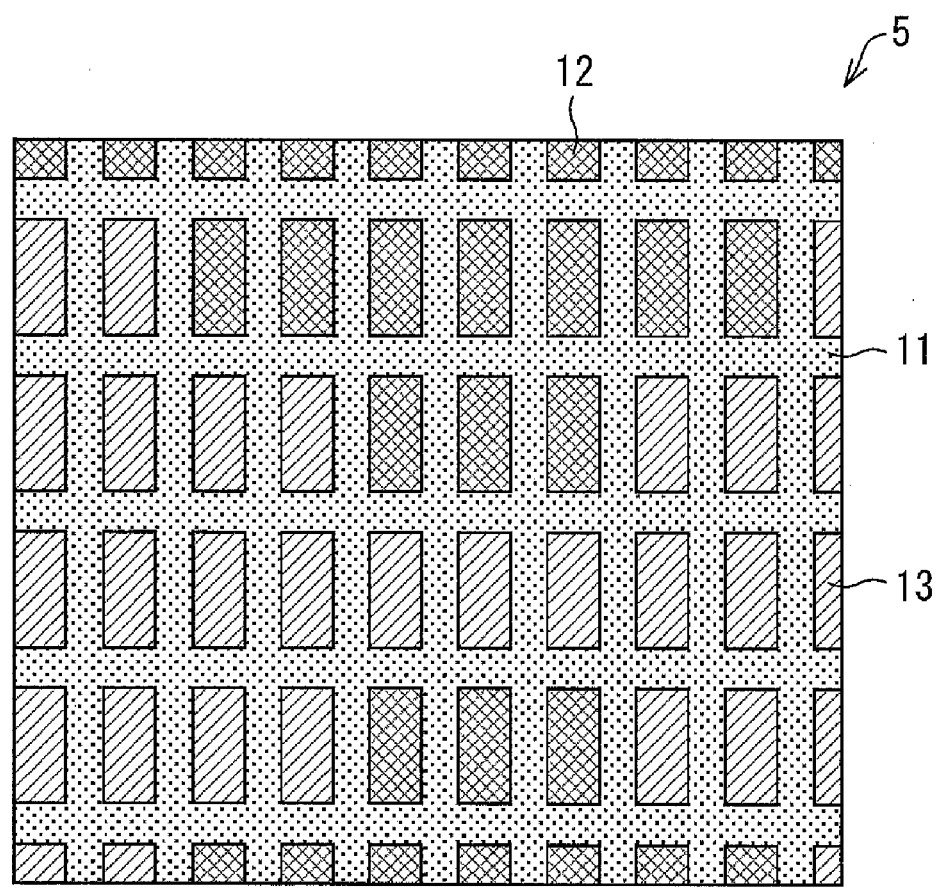
FIG. 7 is a plan view showing a configuration of the opposite substrate as seen from the viewer side (front side).

FIG. 7 is a plan view showing a configuration of the opposite substrate 5 as seen from the viewer side (front side). In the respective display areas surrounded by the black matrix 11, the first electrode 12 or the second electrode 13 is formed. The boundary between the first electrode 12 and the second electrode 13 is hidden by the black matrix 11 and not seen by the viewer.

In the present embodiment, the areas located between the first electrode 12a and the second electrode 13b where the transparent electrodes are not formed correspond in position to the black matrix 11. Therefore, the boundaries between the first electrodes 12a and 12b and the second electrodes 13a and 13b, and the areas where the transparent electrodes are not formed are hidden from the viewer by the black matrix 11. Thus, it is possible to make the transmittance and reflectance even throughout the display region, and it is possible to make the first electrodes 12 and the second electrodes 13, which are the position detection electrodes of the touch panel, not visible to the viewer. Thus, it is possible to improve the display quality of the display device 1.

Also, in the present embodiment, the bridge wiring lines 15 and the contact sections 15a coincide with the black matrix 11 from the viewer side. Therefore, the structure of the bridge wiring lines 15 and the contact sections 15a can be prevented from having a negative effect on the display quality.

The color filters CF may be formed in a layer different from that of the black matrix 11 (the layer between the second insulating layer 16 and the opposite electrode 17, for example). Also, the black matrix 11 may be formed between the second insulating layer 16 and the opposite electrode 17, for example.

(Method of Manufacturing Display Panel)

Next, a method of manufacturing the display panel 2 will be explained. The method of manufacturing the display panel 2 includes a step of manufacturing an active matrix substrate, a step of manufacturing an opposite substrate, and a step of assembling the two substrates together and filling the gap therebetween with liquid crystal.

A known technique can be applied to the method of manufacturing the active matrix substrate, and thus, descriptions thereof are omitted.

Figure 8:
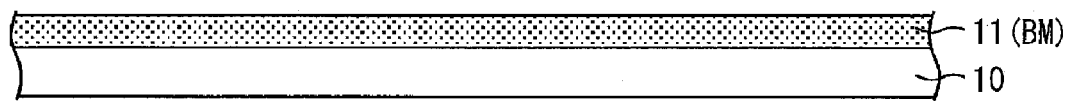
FIGS. 8(a) to 8(e) are cross-sectional views showing manufacturing steps for the opposite substrate.
Figure 8:
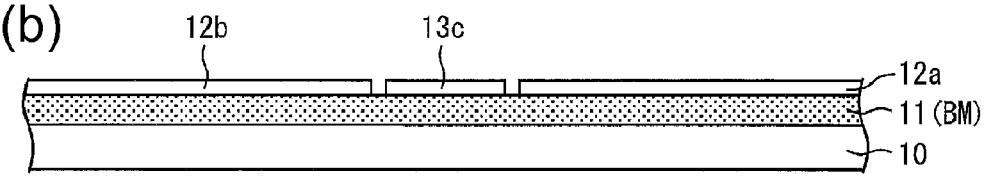
Figure 8:
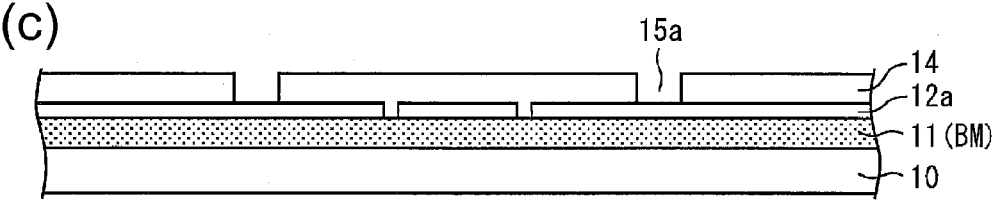
Figure 8:
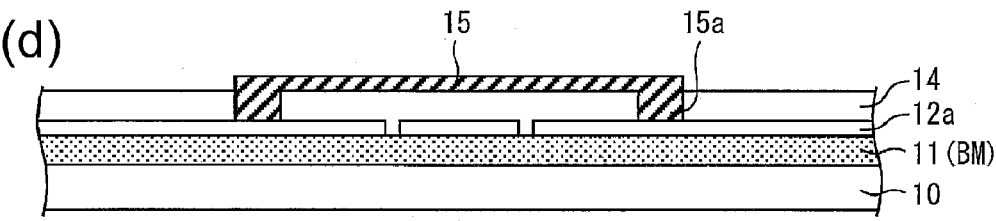
Figure 8:
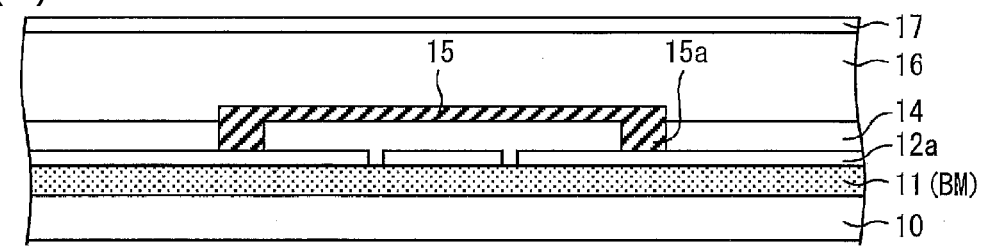

The method of manufacturing the opposite substrate 5 will be described below with reference to FIG. 8. FIG. 8 corresponds to a cross-section of FIG. 4 along the line Y1-Y1'.

First, after forming a light-shielding resin film on a substrate made of glass, plastic, or the like (in this case, the glass substrate 10), the resin film is patterned by photolithography (including an etching step), thus forming the black matrix 11. Next, by pigment dispersion or the like, red, green, and blue color filters are patterned in the spaces of the black matrix 11 (FIG. 8(a)).

A transparent conductive film made of ITO, IZO (indium zinc oxide), zinc oxide, or tin oxide, or a conductive thin film made of graphene or the like is formed by sputtering thereon. Then, patterning is performed by photolithography to remove the resist, thus forming the position detection electrodes (first electrodes 12 and second electrodes 13) (FIG. 8(b)).

Next, an insulating film is formed by CVD (chemical vapor deposition), spin coating, or the like on the entire surface of the glass substrate 10 on which the first electrodes 12 and the second electrodes 13 are formed, thus forming the first insulating layer 14. Next, patterning is performed by photolithography to form contact holes in the first insulating layer 14, and portions of the first insulating layer 14 is removed to form the contact holes 15a (FIG. 8(c)).

Next, on the first insulating layer 14 in which the contact holes 15a are formed, a metal film is formed, the metal film being made of a low resistance metal such as titanium (Ti), copper (Cu), gold (Au), aluminum (Al), tungsten (W), zinc (Zn), nickel (Ni), tin (Sn), chromium (Cr), molybdenum (Mo), or tantalum (Ta), a metal compound thereof, a metal silicide, or the like. Then, patterning by photolithography is performed to form the bridge wiring lines 15 (FIG. 8(d)).

It is preferable that the thickness of the bridge wiring lines 15 be 100 nm or greater from the perspective of lowering resistance, and 300 nm or less in order to ensure the flatness of the opposite electrode 17 and reduce processing cost.

Next, an insulating film is formed by CVD, spin-coating, or the like on the entire surface of the substrate on which the bridge wiring lines 15 have been formed, thus forming the second insulating layer 16. Next, on the second insulating layer 16, a transparent conductive film made of ITO, IZO, zinc oxide, tin oxide, or the like is formed, thus forming the opposite electrode 17 (FIG. 8(e)).

By lastly forming an alignment film (not shown) on the opposite electrode 17, it is possible to manufacture the opposite substrate 5.

The material for the first insulating layer 14 and the second insulating layer 16 can be an organic insulating material (photosensitive resin) such as an acrylic resin, an epoxy resin, a polyurethane resin, or a polyimide resin, or a transparent inorganic insulating material having insulating characteristics such as an $SiN_X$ film (silicon nitride film), for example. Among these, it is preferable that an organic insulating resin such as a photosensitive resin be used, and that the first insulating layer 14 and the second insulating layer 16 be so-called organic insulating films.

Organic insulating films can be made thicker than inorganic insulating films, and have a lower relative permittivity than inorganic insulating films. Whereas silicon nitride has a relative permittivity $\in$ of 6.9, an acrylic resin has a relative permittivity $\in$ of 3.7, for example. Also, organic insulating films have a higher transparency, and thus, they can be made thicker.

Therefore, if the first insulating layer 14 and the second insulating layer 16 are organic insulating layers, it is possible to reduce parasitic capacitance between the position detection electrodes (first electrodes 12 and second electrodes 13) and the opposite electrode 17 due to being able to reduce the thickness and permittivity of the organic insulating films.

If the first insulating layer 14 and the second insulating layer 16 are too thin, then the parasitic capacitance between the position detection electrodes (first electrodes 12 and second electrodes 13) and the opposite electrode 17 becomes large. On the other hand, if the first insulating layer 14 is too thick, then it becomes difficult to form the contact holes 15a. If the second insulating layer 16 is made thick, then it is possible to reduce the parasitic capacitance between the position detection electrodes (first electrodes 12 and second electrodes 13) and the opposite electrode 17.

Also, either the first insulating layer 14 or the second insulating layer 16 may be formed of an inorganic insulating film with the other being formed of an organic insulating film.

The position detection electrodes may be formed on the glass substrate, with the color filters and the black matrix being formed on the insulating layer on the position detection electrodes, and the opposite electrode being formed on the color filter and the black matrix. With this layered structure, it is possible to increase the distance between the position detection electrodes and the opposite electrode, and thus, it is possible to reduce parasitic capacitance therebetween.

A step of assembling the display panel 2 will be described below.

First, a sealing material made of a thermosetting epoxy resin or the like is coated on either the active matrix substrate 4 or the opposite substrate 5 by screen printing in a frame-shaped pattern with a liquid crystal injection hole being formed therein, and spherical spacers made of plastic or silica and having a diameter corresponding to the thickness of the liquid crystal layer are dispersed on the other substrate. Spacers may be formed in positions corresponding to the black matrix 11 of the opposite substrate 5 or the metal wiring lines on the active matrix substrate 4 instead of simply being dispersed.

Next, the active matrix substrate 4 and the opposite substrate 5 are bonded together and the sealing material is cured.

Lastly, liquid crystal is injected by depressurization into the space surrounded by the active matrix substrate 4, the opposite substrate 5, and the sealing material, the liquid crystal injection hole is covered by a UV curable resin, and then UV radiation is used to seal the liquid crystal, thereby forming the liquid crystal layer 6. The display panel 2 is manufactured in this manner.

In an out-cell type touch panel in which a separately manufactured touch panel substrate is bonded to the outside of the display panel, there is a margin of error during the bonding of the display panel and the touch panel substrate. Thus, out-cell touch panels need to be designed with a larger tolerance, taking into consideration the margin of error that occurs when the touch panel is bonded to the touch panel substrate.

By contrast, in an in-cell type touch panel of the present embodiment, position detection electrodes are formed in the opposite substrate 5 where the black matrix 11 is formed. In other words, the position detection electrodes can be formed with ease by photolithography such that the boundaries between the position detection electrodes coincide with the black matrix 11. According to the in-cell type touch panel of the present embodiment, there is no margin of error that would otherwise be present when bonding a touch panel substrate to a display panel, and thus, the touch panel can be designed with a low tolerance. Therefore, according to the present embodiment, it is possible to have a small resultant display device having touch panel functionality.

Embodiment 2

Next, another embodiment of the present invention will be explained. For ease of explanation, the members and components having the same functions as those in the drawings described in Embodiment 1 above are assigned the same reference characters, and the descriptions thereof are omitted.

The layered structure of the opposite substrate of the present embodiment is the same as that shown in FIG. 1. In the present embodiment, the first electrodes 12 and the second electrodes 13 are disposed have a different plan view arrangement than Embodiment 1.

Figure 9:
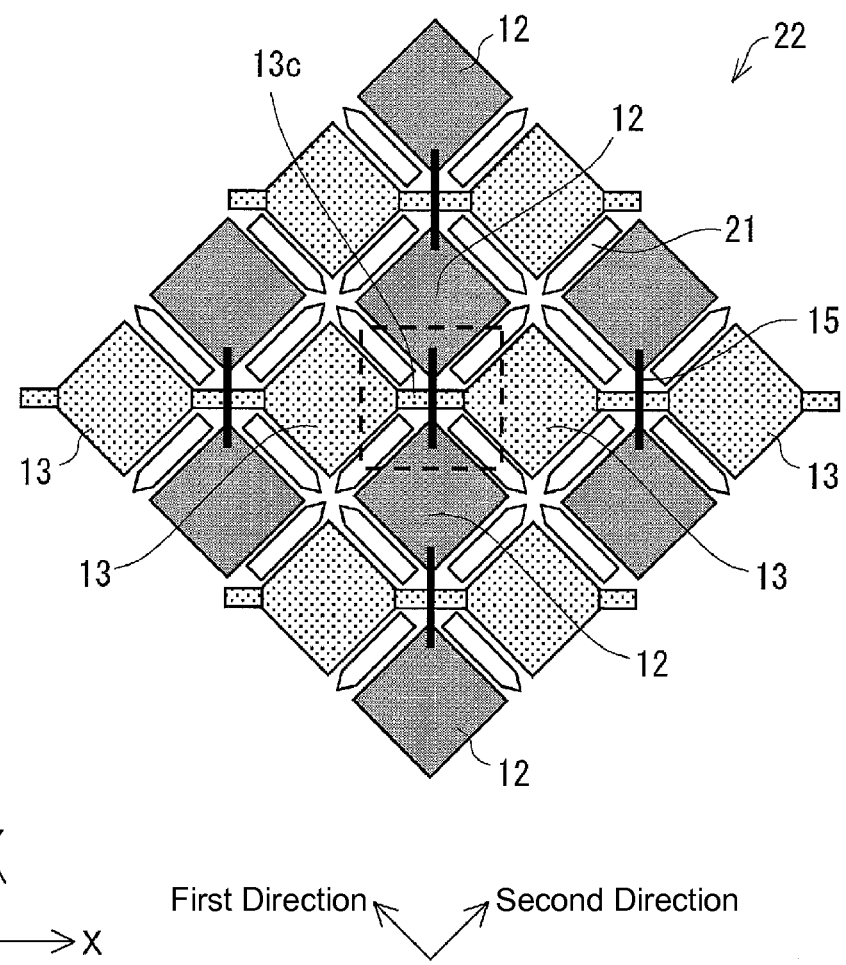
FIG. 9 is a plan view showing a schematic configuration of first electrodes and second electrodes that are position detection electrodes on an opposite substrate of another embodiment of the present invention.

FIG. 9 is a plan view showing a schematic configuration of first electrodes and second electrodes, which are position detection electrodes, on an opposite substrate 22 of the present embodiment. The plurality of first electrodes 12 are arranged in the Y direction and the plurality of second electrodes 13 are arranged in the X direction. Both of these electrodes (12 and 13) are arranged alternately in a first direction and a second direction. Also, the plurality of second electrodes 13 arranged in the X direction are electrically connected to each other through transparent relay electrodes 13c (connecting wiring lines) formed in the same layer therewith. The plurality of first electrodes 12 arranged in the Y direction are electrically connected to each other through bridge wiring lines 15 formed in a different layer therefrom. Either the first electrodes 12 or the second electrodes 13 function as the driving electrodes, the other functioning as detection electrodes.

In the present embodiment, a plurality of dummy electrodes 21 (transmissive patterns) are provided in the same layer as the first electrodes 12 and the second electrodes 13. The dummy electrodes 21 are disposed between the first electrodes 12 and the second electrodes 13. The dummy electrodes 21 are transparent and can be made of the same material as the first electrodes 12 and the second electrodes 13. By doing so, the areas where the dummy electrodes 21 are formed and the areas where the first electrodes 12 or the second electrodes 13 are formed can have the same transmittance and reflectance. The dummy electrodes 21 are not electrically connected to the first electrodes 12 or the second electrodes 13, and are floating.

Figure 10:
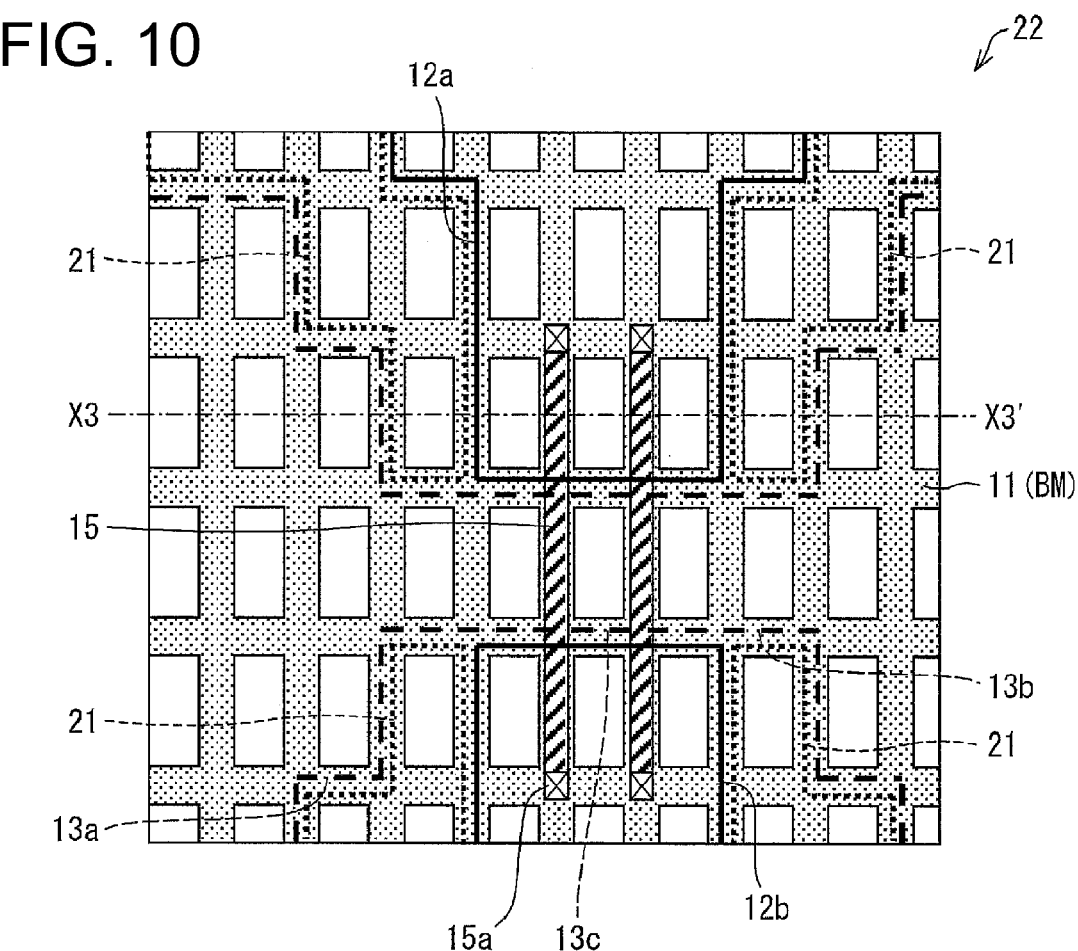
FIG. 10 is a plan view showing a configuration of the first electrodes and the second electrodes when viewing the opposite substrate from the opposite electrode side.

FIG. 10 is a plan view showing a configuration of the first electrodes and the second electrodes when viewing the opposite substrate 22 of the present embodiment from the opposite electrode side. FIG. 10 shows a magnified view of the area in FIG. 9 surrounded by the dotted line. FIG. 10 shows two adjacent first electrodes 12a and 12b, two adjacent second electrodes 13a and 13b, bridge wiring lines 15, a black matrix 11, and dummy electrodes 21.

Figure 11:
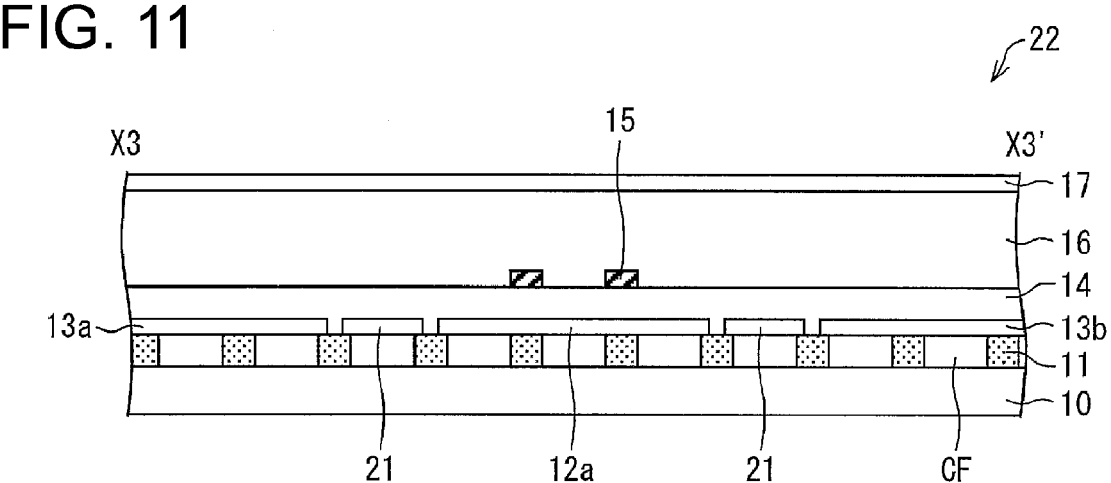
FIG. 11 is a cross-sectional view of FIG. 10 along the line X3-X3'.

FIG. 11 is a cross-sectional view of FIG. 10 along the line X3-X3'.

A second electrode 13a and a second electrode 13b are electrically connected to each other through the relay electrode 13c formed in the same layer therewith. A first electrode 12a and a first electrode 12b are electrically connected to each other through the bridge wiring line 15 formed in a different layer therefrom.

The black matrix 11 is formed in a grid pattern so as to separate color filters CF of the respective colors (RGB) corresponding to the respective pixels. The areas surrounded by the black matrix 11 are display areas corresponding to the respective pixels. The first electrodes 12a and 12b and the second electrodes 13a and 13b are formed such that boundaries therebetween coincide with the black matrix 11 in a plan view.

The dummy electrodes 21 are respectively formed between the first electrodes 12a and 12b and the second electrodes 13a and 13b. The dummy electrodes 21 are formed such that the edges thereof coincide with the black matrix 11 in a plan view.

In other words, the first electrodes 12a and 12b, the second electrodes 13a and 13b, and the dummy electrodes 21 are respectively formed such that the boundaries therebetween are along the grid of the black matrix 11. The boundaries between the first electrodes 12a and 12b, the second electrodes 13a and 13b, and the dummy electrodes 21 do not protrude out of where the black matrix 11 is formed, and are included within the area where the black matrix 11 is formed.

Figure 12:
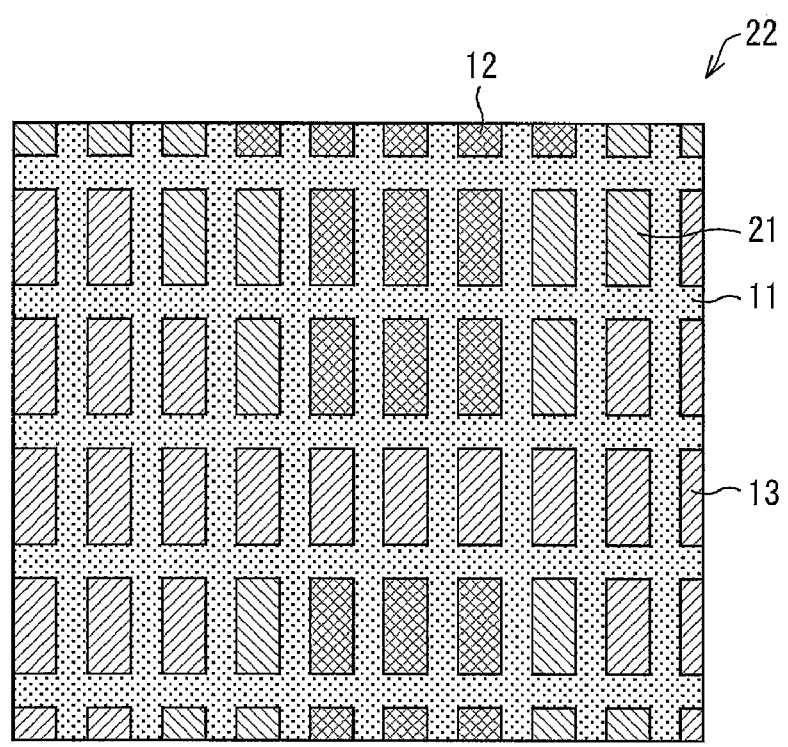
FIG. 12 is a plan view showing a configuration of the opposite substrate as seen from the viewer side (front side).

FIG. 12 is a plan view showing a configuration of the opposite substrate 22 as seen from the viewer side (front side). In the respective display areas delineated by the black matrix 11, one of the first electrode 12, the second electrode 13, and the dummy electrode 21 is formed. The boundaries between the first electrodes 12, the second electrodes 13, and the dummy electrodes 21 are hidden by the black matrix 11 and not seen by the viewer.

If the edge of the first electrode 12 is too close to the edge of the second electrode 13, the cross capacitance between the first electrode 12 and the second electrode 13 becomes large. If the cross capacitance is too large, then the CR time constant (capacitance×resistance) between the first electrode 12 and the second electrode 13 is large, and thus, the response (change in potential) of the detection electrodes (second electrodes 13, for example) when a driving voltage is applied to the driving electrodes (first electrodes 12, for example) is delayed. As a result, the touch detection operation becomes slow or the S/N ratio of the signal for detecting touch decreases, which results in the problem that stable high accuracy detection cannot be performed. As a result, when cross capacitance is too high, there is a possibility that the touch panel performance decreases. In order to detect changes in capacitance by touch, a certain amount of cross capacitance is naturally necessary.

Figure 13:
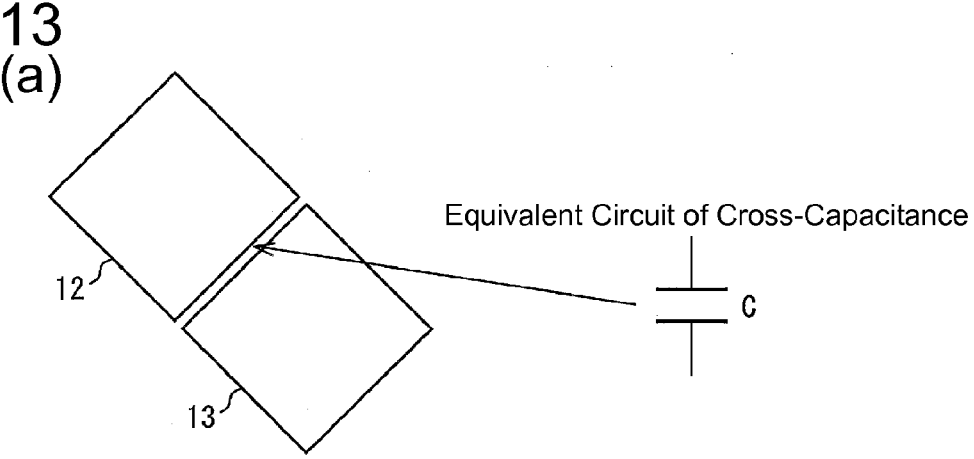
FIG. 13(a) is a schematic view showing a capacitance between a first electrode and a second electrode on the opposite substrate shown in FIG. 4.
FIG. 13(b) is a schematic view showing a capacitance between a first electrode and a second electrode on the opposite substrate shown in FIG. 10.
Figure 13:
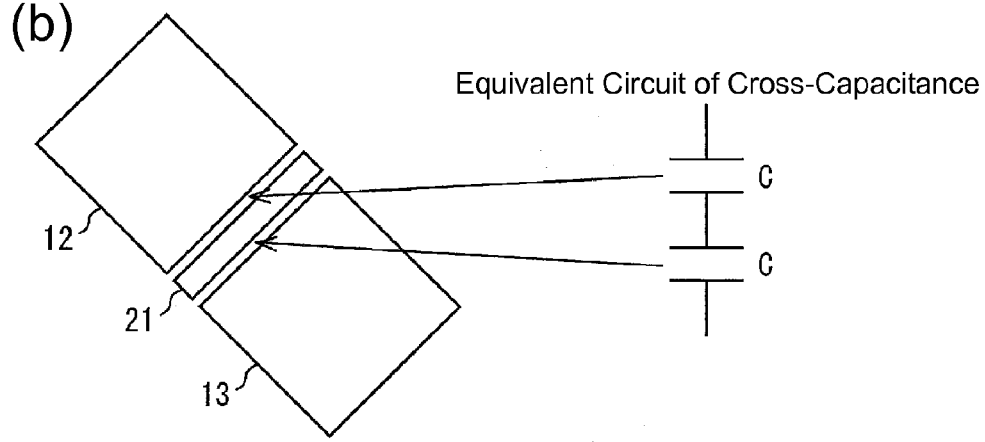

FIG. 13(a) is a schematic view showing the capacitance between the first electrode 12 and the second electrode 13 on the opposite substrate 5 shown in FIG. 4, and FIG. 13(b) is a schematic view showing the capacitance between the first electrode 12 and the second electrode 13 on the opposite substrate 22 of the present embodiment shown in FIG. 10. FIGS. 13(a) and 13(b) also show equivalent circuits representing the respective cross capacitances. Also, while parasitic capacitance is technically present between respective layers and the like of the opposite substrate, only the capacitance between areas where the first electrode 12 and the second electrode 13 are proximal will be considered here.

In the configuration shown in FIG. 13(a) (configuration shown in FIG. 4), the first electrode 12 and the second electrode 13 are adjacent to each other with a gap d therebetween. In such a case, the value of the capacitance (cross capacitance) therebetween is C.

In the configuration shown in FIG. 13(b) (configuration of FIG. 10), the first electrode 12 and the dummy electrode 21 are adjacent to each other with the same size gap d therebetween, and the dummy electrode 21 and the second electrode 13 are adjacent to each other with the same size gap d therebetween. Thus, in the configuration of the present embodiment shown in FIG. 13(d), the cross capacitance is substantially equal to that of two capacitors of the capacitance value C being directly connected to each other. In other words, by forming the dummy electrode 21 between the first electrode 12 and the second electrode 13, it is possible to reduce the cross capacitance value to C/2. Therefore, in the present embodiment, it is possible to prevent the cross capacitance from become too large, and it is possible to mitigate a decrease in touch panel performance.

The dummy electrode 21 is made of the same material as the first electrode 12 and the second electrode 13, and it is possible to form it at the same time as the first electrode 12 and the second electrode 13 by photolithography. As long as the dummy electrode 21 has an equal transmittance to the first electrode 12 and the second electrode 13, a material different from the first electrode 12 and the second electrode 13 may be used, and the dummy electrode 21 need not necessarily be a conductor. As long as the index of refraction of the dummy electrode 21 is equal to that of the first electrode 12 and the second electrode 13, it is possible to make the reflectance at the edge of the dummy electrode 21 equal to that of the first electrode 12 and the second electrode 13.

Modification Example

By further splitting the dummy electrode 21 of Embodiment 2, it is possible to further reduce cross capacitance.

Figure 14:
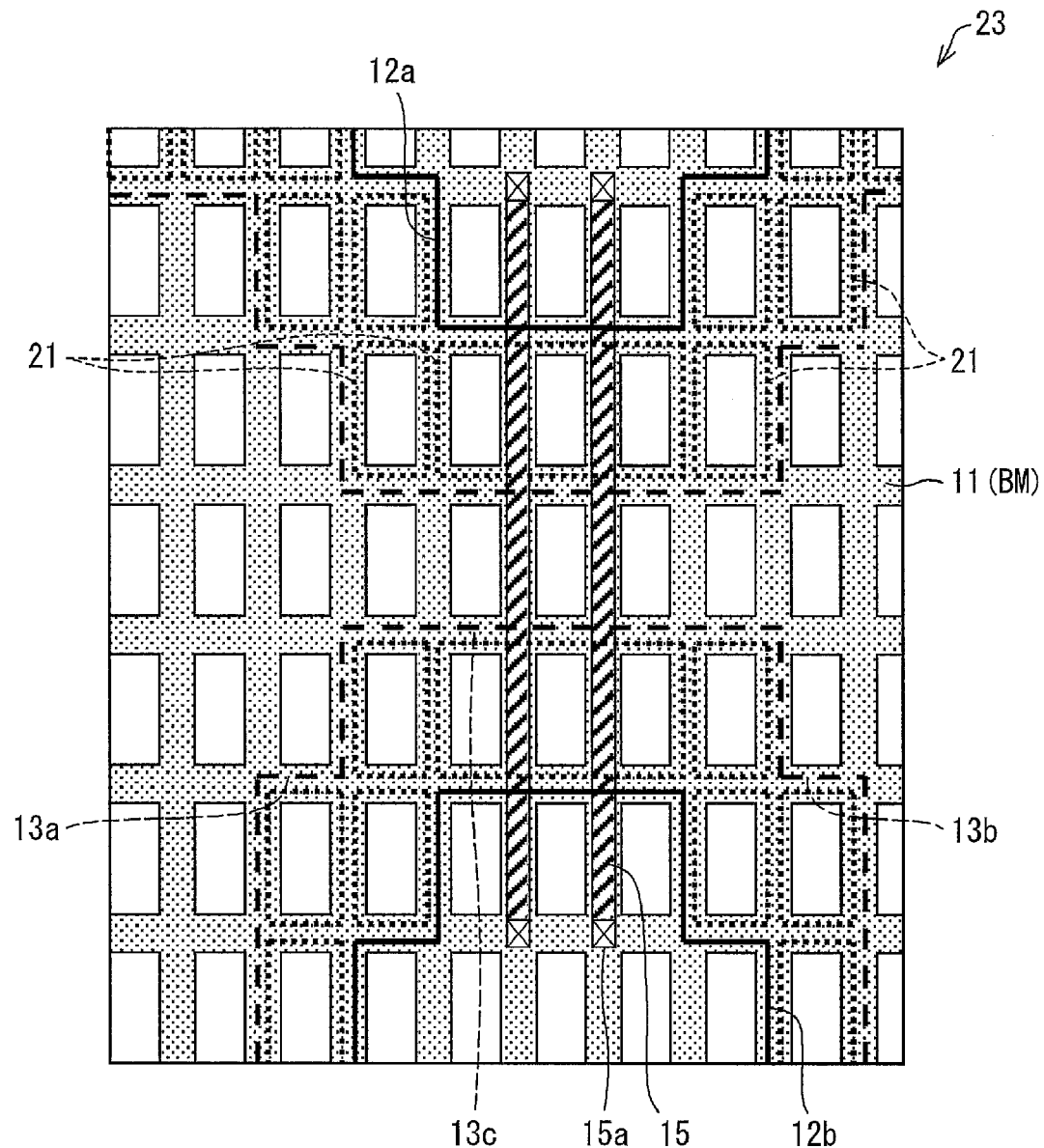
FIG. 14 is a plan view showing a configuration of an opposite substrate of a modification example as seen from the opposite electrode side.

FIG. 14 is a plan view showing a configuration of an opposite substrate 23 of a modification example as seen from the opposite electrode side. In the configuration shown in FIG. 14, the dummy electrode 21 is split so as to be the same size as areas delineated by the black matrix 11 (areas corresponding to pixels). The dummy electrodes 21 are split for each pixel and electrically insulated from each other. That is, one dummy electrode 21 covers an area corresponding to one pixel, and the edges thereof coincide with the black matrix 11. Also, a dummy electrode 21 is disposed between the first electrodes 12a and 12b and a relay electrode 13c. The first electrodes 12a and 12b and the second electrodes 13a and 13b are disposed so as to be adjacent to each other across the dummy electrodes 21.

According to this configuration, the dummy electrodes 21 are split into areas delineated by the black matrix 11, and thus, it is possible to further reduce the cross capacitance between the first electrodes 12a and 12b and the second electrodes 13a and 13b.

Also, the first electrodes 12a and 12b are not directly adjacent to the second electrodes 13a and 13b and the relay electrode 13c, and are instead adjacent to each other across the dummy electrode 21. Thus, even if a short-circuit were to occur in the gap between electrodes due to etching defects or the like, for example, the dummy electrodes 21 are split, and thus, the possibility of conduction occurring between the first electrodes 12a and 12b and the second electrodes 13a and 13b is very low. Thus, it is possible to increase the manufacturing yield.

Embodiment 3

Next, yet another embodiment of the present invention will be explained. For ease of explanation, the members and components having the same functions as those in the drawings described in Embodiment 1 above are assigned the same reference characters, and the descriptions thereof are omitted.

Figure 15:
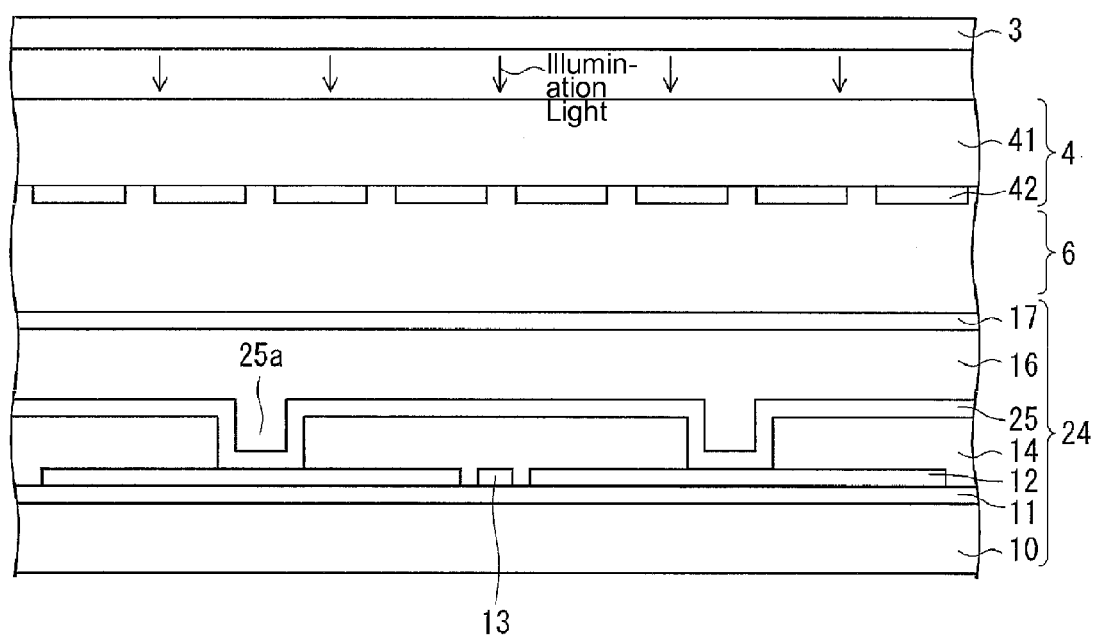
FIG. 15 is a cross-sectional view of a schematic configuration of a display device of yet another embodiment of the present invention.

FIG. 15 is a cross-sectional view showing a schematic configuration of a display device of the present embodiment. The layered structure is the same as that of Embodiment 1, but in the present embodiment, first wiring lines 25 are used instead of the bridge wiring lines. The first wiring lines 25 extend along the direction in which the plurality of first electrodes 12 are aligned, without any break therein. The first wiring line 25 is electrically connected to the first electrodes 12 through a contact section 25a (first contact hole). The first wiring lines 25 electrically connect adjacent first electrodes 12.

Figure 16:
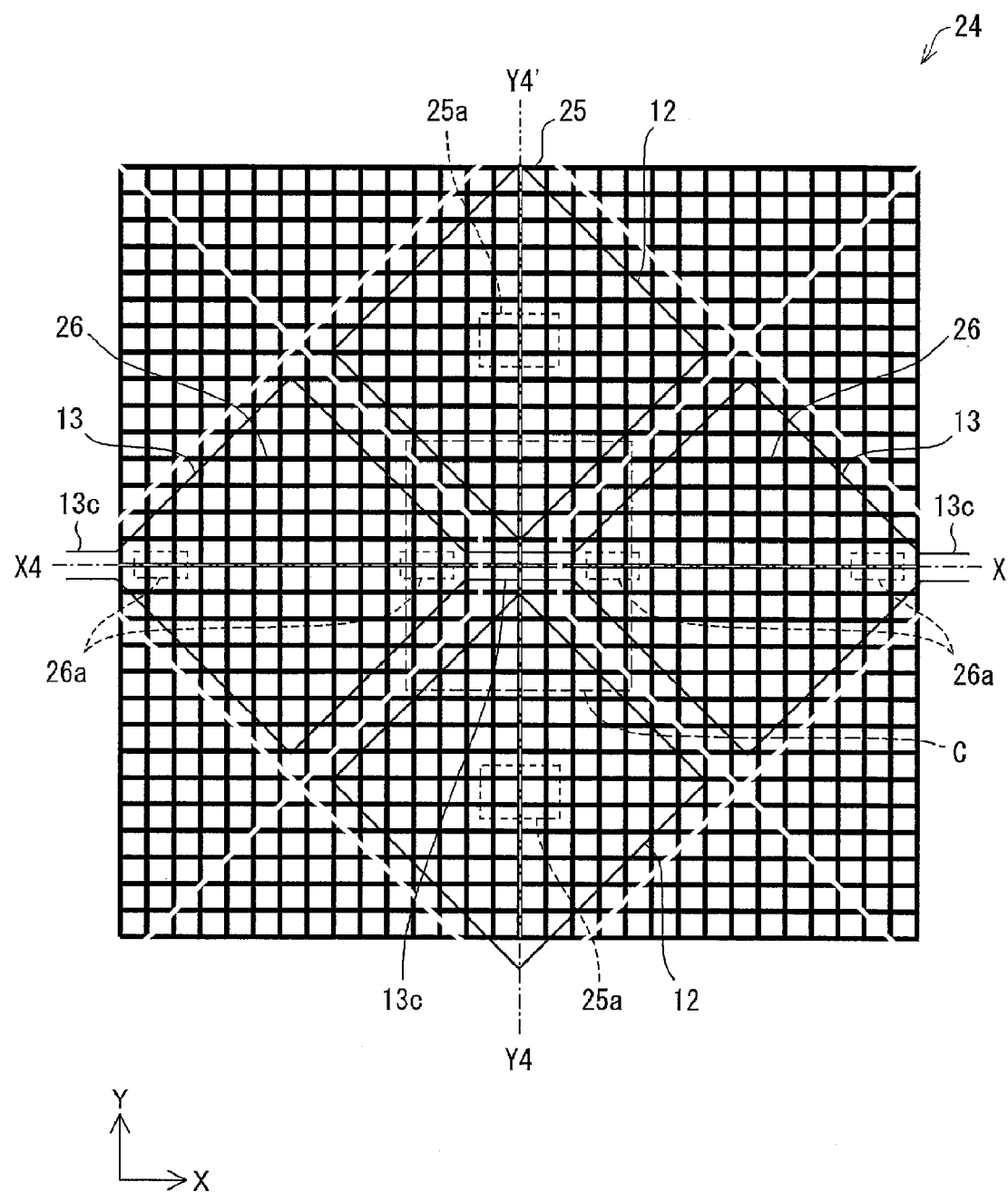
FIG. 16 is a plan view showing a schematic configuration of first electrodes and second electrodes, which are position detection electrodes of the display device.

FIG. 16 is a plan view showing a schematic configuration of first electrodes and second electrodes, which are position detection electrodes of the present embodiment. FIG. 16 shows a schematic configuration, and the depiction therein of the grid of the wiring lines and the shape of the electrodes is not to scale.

Figure 17:
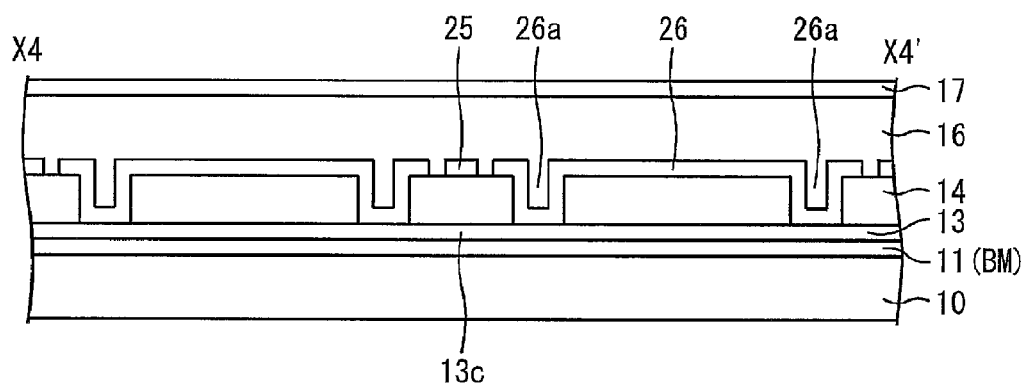
FIG. 17(a) is a cross-sectional view of FIG. 16 along the line X4-X4'.
FIG. 17(b) is a cross-sectional view of FIG. 16 along the line Y4-Y4'.
Figure 17:
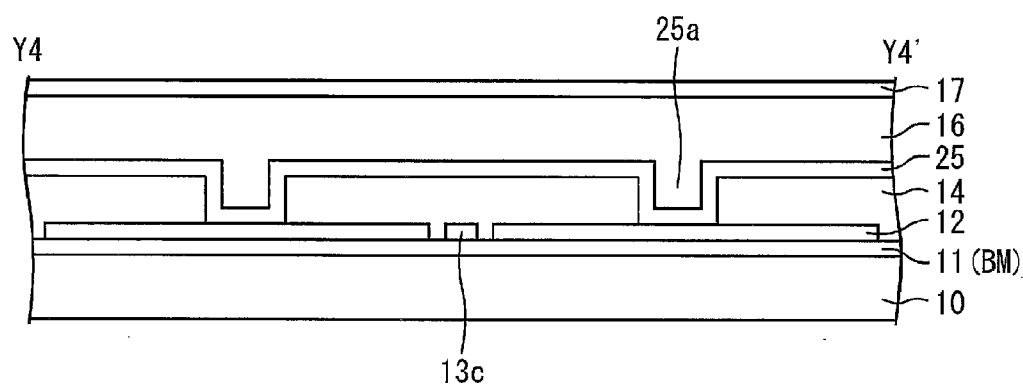

FIG. 17(a) is a cross-sectional view of FIG. 16 along the line X4-X4', and FIG. 17(b) is a cross-sectional view of FIG. 16 along the line Y4-Y4'.

The plurality of first electrodes 12 are arranged in the Y direction and the plurality of second electrodes 13 are arranged in the X direction. Also, the plurality of second electrodes 13 arranged in the X direction are electrically connected to each other through transparent relay electrodes 13c (connecting wiring lines) formed in the same layer therewith. In reality, the first electrodes 12 and the second electrodes 13 are arranged such that the respective edges of the first electrodes 12 and the second electrodes 13 coincide with the grid-patterned black matrix (not shown in FIG. 16), and FIG. 16 shows a schematic shape.

The opposite substrate 24 includes the first wiring lines 25 (first light-shielding wiring lines) and second wiring lines 26 (second light-shielding wiring lines) that are in a grid pattern. The first wiring lines 25 and the second wiring lines 26 are formed in a layer different from that of the first electrodes 12 and the second electrodes 13. In the present embodiment, the first wiring lines 25 and the second wiring lines 26 are formed in the same layer as each other, but may be formed in different layers. In this case, it is possible to connect the plurality of second wiring lines 26 to each other in the X direction. In the present embodiment, the first wiring lines 25 and the second wiring lines 26 are conductive metal wiring lines having low resistance (Al, for example).

The first wiring lines 25 have a grid pattern formed in regions corresponding to the first electrodes 12. The first wiring lines 25 extend in the Y direction and are connected to the plurality of first electrodes 12 through contact sections 25a. The first wiring lines 25 also have the function of connecting the plurality of first electrodes 12 to each other. The plurality of first electrodes 12 arranged in the Y direction are connected by low resistance first wiring lines 25, and thus, the total resistance can be decreased.

The second wiring lines 26 have a grid pattern formed in regions corresponding to the second electrodes 13. One second wiring line 26 is connected to one second electrode 13 through a plurality of contact sections 26a (second contact holes). The contact sections 26a are formed in at least two locations in one second electrode 13: in the vicinity of a relay electrode 13c connected to the left side (position adjacent to left relay electrode 13c); and in the vicinity of a relay electrode 13c connected to the right side (position adjacent to right relay electrode 13c). By having this connective configuration, it is possible for current flowing in the X direction to be bypassed to the low resistance second wiring line 26, and thus, it is possible to reduce the total resistance of the plurality of second electrodes 13 extending in the X direction.

There is no conduction between the first electrode 12 and the second electrode 13 or between the first wiring line 25 and the second wiring line 26, and capacitance is formed between the first electrode 12 and the second electrode 13. In the present embodiment, either of the first electrodes 12 or the second electrodes 13 functions as driving electrodes, the other functioning as detection electrodes.

Figure 18:
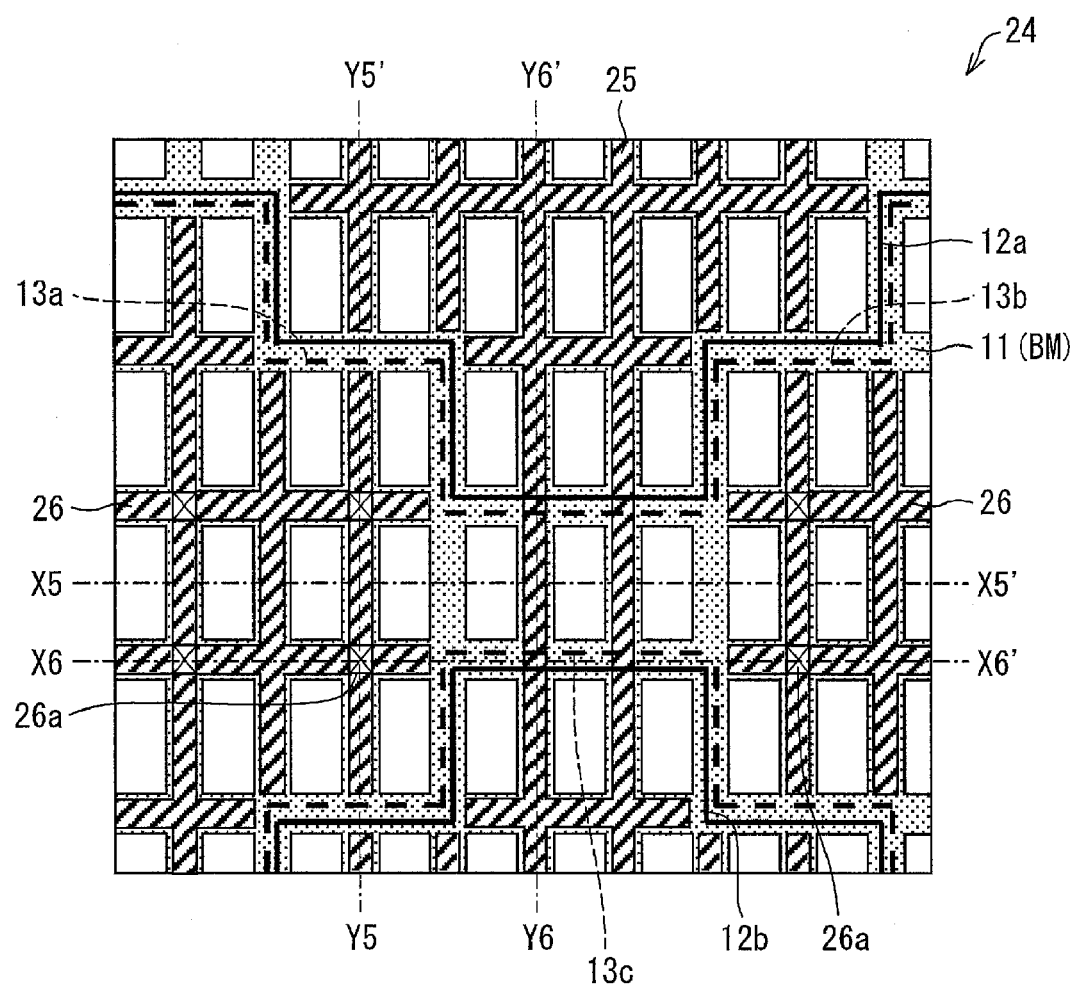
FIG. 18 is a plan view showing a configuration of the first electrodes and the second electrodes when viewing the opposite substrate of the display device from the opposite electrode side.

FIG. 18 is a plan view showing a configuration of the first electrode and the second electrode when viewing the opposite substrate 24 from the opposite electrode side. FIG. 18 shows a magnified view of an area C in FIG. 17 surrounded by the dotted line. FIG. 18 shows adjacent two first electrodes 12a and 12b, adjacent two second electrodes 13a and 13b, the first wiring lines 25, the second wiring lines 26, and the black matrix 11.

Figure 19:
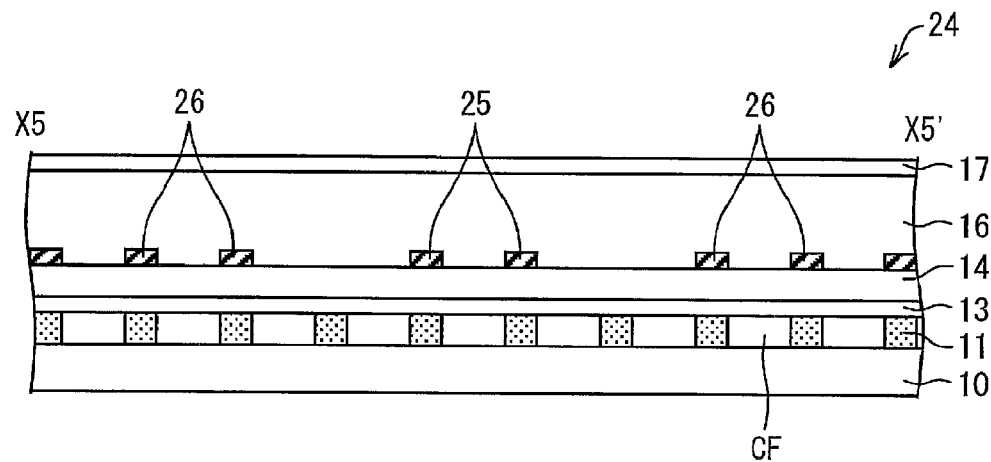
FIG. 19(a) is a cross-sectional view of FIG. 18 along the line X5-X5'.
FIG. 19(b) is a cross-sectional view of FIG. 18 along the line X6-X6'.
Figure 19:
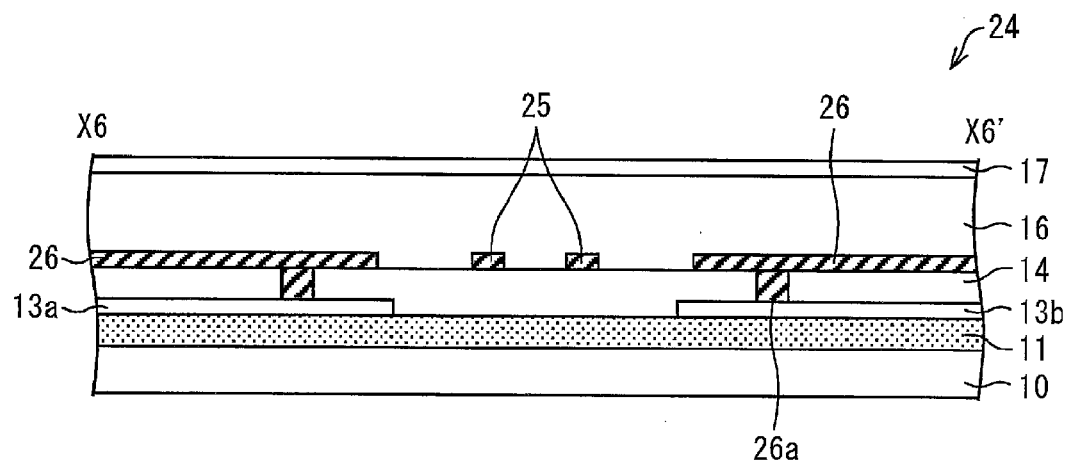
Figure 20:
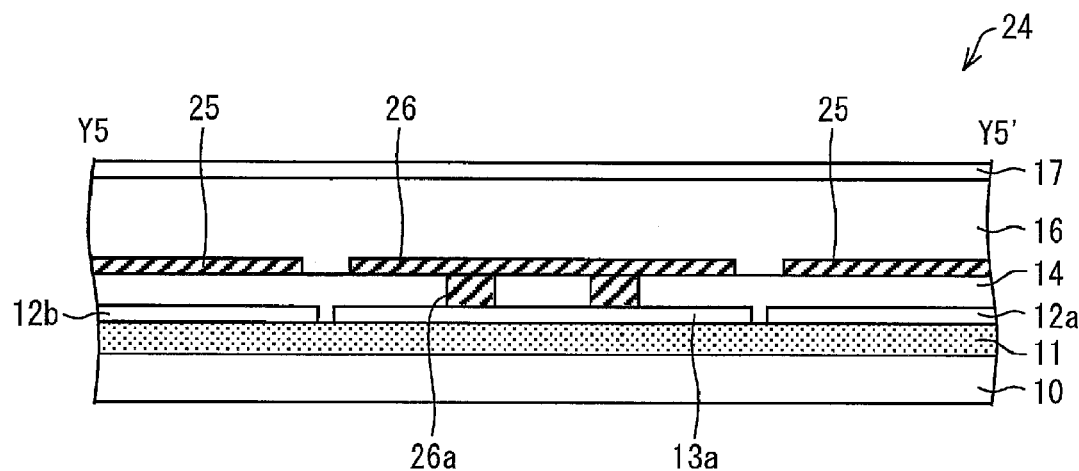
FIG. 20(a) is a cross-sectional view of FIG. 18 along the line Y5-Y5'.
FIG. 20(b) is a cross-sectional view of FIG. 18 along the line Y6-Y6'.
Figure 20:
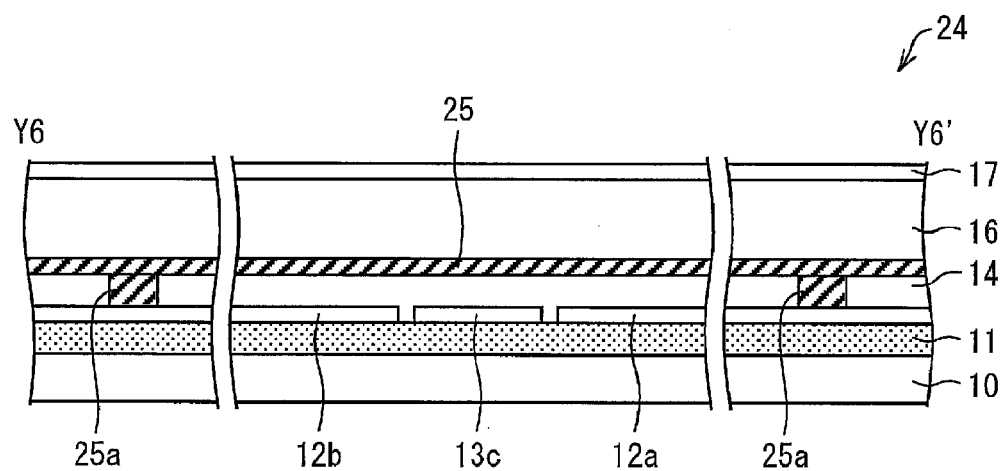

FIG. 19(a) is a cross-sectional view of FIG. 18 along the line X5-X5', and FIG. 19(b) is a cross-sectional view of FIG. 18 along the line X6-X6'. FIG. 20(a) is a cross-sectional view of FIG. 18 along the line Y5-Y5', and FIG. 20(b) is a cross-sectional view of FIG. 18 along the line Y6-Y6'.

A second electrode 13a and a second electrode 13b are electrically connected to each other through the relay electrode 13c formed in the same layer therewith. A first electrode 12a and a first electrode 12b are electrically connected to each other through the first wiring lines 25 formed in a different layer therefrom.

The black matrix 11 is formed in a grid pattern so as to separate color filters CF of the respective colors (RGB) corresponding to the respective pixels. The areas surrounded by the black matrix 11 are display areas corresponding to the respective pixels. The first electrodes 12a and 12b and the second electrodes 13a and 13b are formed such that boundaries therebetween coincide with the black matrix 11 in a plan view.

The first electrodes 12a and 12b and the second electrodes 13a and 13b respectively have edges formed along the grid pattern of the black matrix 11. The boundaries between the first electrodes 12a and 12b and the second electrodes 13a and 13b are included within the area where the black matrix 11 is formed without protruding to areas where the black matrix 11 is not formed.

The first wiring lines 25 are formed in a grid pattern in areas coinciding with the black matrix 11 and corresponding to the first electrodes 12a and 12b. The first wiring lines 25 are formed between the first electrode 12a and the first electrode 12b along the black matrix 11 and in areas coinciding with the black matrix 11. The contact sections 25a of the first wiring lines 25 are also formed in areas coinciding with the black matrix 11.

The second wiring lines 26 are formed in a grid pattern in areas coinciding with the black matrix 11 and corresponding to the second electrodes 13a and 13b. The second wiring lines 26 of the second electrode 13a are not directly connected to the second wiring lines 26 of the second electrode 13b. The contact sections 26a of the second wiring lines 26 are also formed in areas coinciding with the black matrix 11.

The first wiring lines 25, the contact sections 25a, the second wiring lines 26, and the contact sections 26a are included in the areas where the black matrix 11 is formed without protruding outside to where the black matrix 11 is not formed. Thus, the boundaries between the first electrodes 12 and the second electrodes 13, the first wiring lines 25, and the second wiring lines 26 are hidden from the viewer by the black matrix 11.

In general, the performance of the touch panel depends on the resistance (R) of the position detection electrodes (driving electrodes and detection electrodes), and the capacitance (C) for each line of position detection electrodes (driving electrodes and detection electrodes). The capacitance includes, besides the cross capacitance formed between the driving electrodes and the detection electrodes, parasitic capacitance formed between the position detection electrodes (driving electrodes and detection electrodes) and other conductors. In in-cell type touch panels, the position detection electrodes are formed in the opposite substrate, and thus, the distance between the position detection electrodes and the opposite electrode used for display becomes small, resulting in the parasitic capacitance therebetween to become very large. The parasitic capacitance becomes a load on detection driving, and the CR time constant (capacitance×resistance) becomes large, resulting in lower performance. In order to improve performance of the touch panel, it is necessary to reduce the CR time constant of the position detection electrodes. However, materials that can be used as transparent electrodes (ITO, for example) generally have a large resistance.

According to the present embodiment, in addition to position detection electrodes that are transparent electrodes, the first wiring lines 25 and the second wiring lines 26 are provided in a grid pattern along the black matrix 11. The first wiring lines 25 and the second wiring lines 26 coincide with the black matrix 11, and thus, do not have an effect on display; therefore, they can be formed of light-shielding low resistance metal. Therefore, it is possible to make the resistance of the first electrodes 12 aligned in the column direction and the resistance of the second electrodes 13 aligned in the row direction small, thereby making the CR time constant small.

It is naturally possible to combine the present embodiment with the configuration of Embodiment 2, which includes dummy electrodes, thereby further reducing the CR time constant.

(Configuration Example of Position Detection Electrodes)

The effect of resistance reduction in one configuration example provided with the first wiring lines 25 and the second wiring lines 26 will be described below.

Figure 21:
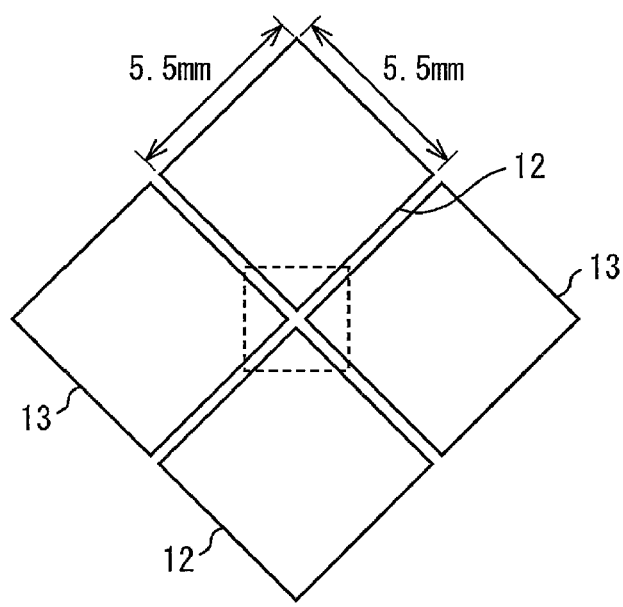
FIG. 21(a) is a plan view showing a schematic form of a region where the position detection electrodes are formed.
FIG. 21(b) is a schematic plan view in which the region in FIG. 21(a) surrounded by the dotted line is magnified.
Figure 21:
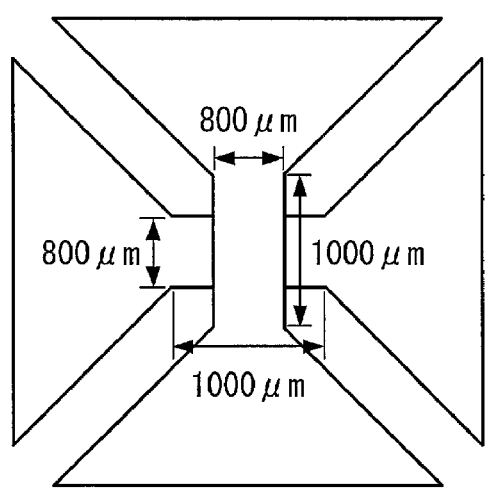

FIG. 21(a) is a plan view showing a schematic shape of a region where position detection electrodes are formed, and FIG. 21(b) is a magnified view of the area in FIG. 21(a) surrounded by the dotted line, and is a plan view of a schematic shape of an intersection in the area where the position detection electrodes are formed. In reality, the first electrodes 12 and the second electrodes 13 are formed along the black matrix (not shown), but FIG. 21 shows a schematic shape.

The regions where the first electrodes 12 and the second electrodes 13 are respectively formed are diamond (square) shaped with one side being 5.5 mm. The area of the intersection shown in FIG. 21(b) has a width of 800 μm and a length of 1000 μm. The sheet resistance of the ITO transparent electrode that forms the first electrodes 12 and the second electrodes 13 is 100 Ω/sq. The first wiring lines and the second wiring lines (not shown) are 5 μm in thickness and 15 μm in width. The sheet resistance of the metal wiring lines that are the first wiring lines and the second wiring lines is 0.2 Ω/sq.

The first wiring lines and the second wiring lines are formed in the same grid pattern as the black matrix (not shown) in areas corresponding respectively to the first electrodes 12 and the second electrodes 13. Here, the size of the pixels of the display panel is 40 μm (horizontal)×120 μm (vertical) (equivalent to 200 ppi). In this case, in the intersection, there are 21 metal wiring lines in the vertical direction and 7 metal wiring lines in the horizontal direction between the first electrodes 12.

If only transparent electrodes are provided and no metal wiring lines are provided, for example, the resistance per electrode pattern becomes the sum of a 200Ω resistance of the diamond-shaped portion and a 125Ω resistance of the intersection. By contrast, if metal wiring lines in a grid pattern are provided in areas corresponding to the diamond-shaped portion and the intersection, then the resistance per electrode pattern becomes the sum of a 4Ω resistance of the diamond-shaped portion and a 2Ω resistance of the intersection.

In other words, by provided low resistance metal wiring lines in addition to the transparent electrodes, it is possible to reduce the resistance per position detection electrode line to approximately 1/50. As a result, it is possible to reduce the CR time constant of the position detection electrodes. Therefore, it is possible to improve the operational speed of the touch panel or to improve the S/N ratio of the signal for detecting touch. In other words, when metal wiring lines are provided, it is possible to increase the operational speed by approximately 50 times while attaining the same S/N ratio or to improve the S/N ratio by approximately 7 times at the same operational speed compared to a case in which the metal wiring lines are not provided.

Embodiments of the present invention have been described with a liquid crystal display device as an example, but the present invention is not limited thereto, and can be applied to display devices such as organic EL displays and plasma displays. The position detection electrodes simply need to be provided on the panel in which a black matrix is formed.

SUMMARY

A capacitive touch panel substrate for use as one of a pair of substrates included in a display panel includes: a substrate; a black matrix formed over the substrate in a grid pattern to correspond to respective pixels; a plurality of first transmissive electrodes arranged over the substrate in a first direction and electrically connected to each other; and a plurality of second transmissive electrodes arranged over the substrate in a second direction that intersects with the first direction and electrically connected to each other, edges of the first transmissive electrodes being positioned in an area coinciding with the black matrix when the touch panel substrate is viewed in a plan view, edges of the second transmissive electrodes being positioned in an area coinciding with the black matrix when the touch panel substrate is viewed in a plan view.

According to this configuration, the boundary between the first transmissive electrode and the second transmissive electrode is positioned in an area coinciding with the black matrix. Therefore, it is possible to prevent the boundary between the first transmissive electrode and the second transmissive electrode from being seen by the viewer. Thus, it is possible to improve display quality.

Also, the touch panel substrate can be configured such that the edges of the first transmissive electrodes are formed along the black matrix when the touch panel substrate is viewed in a plan view, and the edges of the second transmissive electrodes are formed along the black matrix when the touch panel substrate is viewed in a plan view.

Also, the touch panel substrate can be configured so as to further include transmissive patterns formed between the first transmissive electrodes and the second transmissive electrodes, edges of the transmissive patterns being positioned in an area coinciding with the black matrix when the touch panel substrate is viewed in a plan view.

Also, it is possible to make a transmittance of the transmissive patterns is equal to a transmittance of the first transmissive electrodes.

Also, the transmissive patterns, the first transmissive electrodes, and the second transmissive electrodes can be formed of materials having an equal index of refraction.

Also, the transmissive patterns, the first transmissive electrodes, and the second transmissive electrodes can be formed of the same material.

Also, it is possible to have a configuration in which one of the first transmissive electrodes and one of the second transmissive electrodes are adjacent to each other across a plurality of the transmissive patterns disposed therebetween, and the plurality of transmissive patterns are electrically insulated from each other.

It is possible to have a configuration in which the plurality of transmissive patterns are separately provided for each pixel.

Also, the touch panel substrate can be configured so as to further include a transparent relay electrode formed in the same layer as the plurality of second transmissive electrodes, the plurality of second transmissive electrodes being electrically connected via the relay electrode, edges of the relay electrode being positioned in an area coinciding with the black matrix, when the touch panel substrate is viewed in a plan view.

Also, the touch panel substrate can be configured so as to further include first light-shielding wiring lines formed in a layer different from the plurality of first transmissive electrodes, the plurality of first transmissive electrodes being electrically connected to each other via the first light-shielding wiring lines, the first light-shielding wiring lines being positioned in areas coinciding with the black matrix when the touch panel substrate is viewed in a plan view.

Also, the touch panel substrate can be configured such that a plurality of first contact holes are formed to electrically connect the first light-shielding wiring lines to the plurality of first transmissive electrodes, the plurality of first contact holes being positioned in an area coinciding with the black matrix when the touch panel substrate is viewed in a plan view.

Also, it is possible to have a configuration in which the first light-shielding wiring lines are formed in a grid pattern in areas, where the first transmissive electrodes are formed, coinciding with the black matrix.

Also, the touch panel substrate can be configured so as to further include second light-shielding wiring lines formed in a layer different from the plurality of second transmissive electrodes, the second light-shielding wiring lines being positioned in areas coinciding with the black matrix when the touch panel substrate is viewed in a plan view, one of the second transmissive electrodes being electrically connected to the second light-shielding wiring lines via at least two second contact holes, the at least two second contact holes being positioned adjacent to two relay electrodes respectively connected to the second transmissive electrodes.

A display panel of one aspect of the present invention includes: the above-mentioned touch panel substrate, an electrooptical element, and another substrate, the electrooptical element being sandwiched between the touch panel substrate and the other substrate.

A display device of one aspect of the present invention includes the above-mentioned display panel.

The present invention is not limited to the embodiments described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention can be used for a display device having touch panel functionality.

DESCRIPTION OF REFERENCE CHARACTERS 1 display device
2 display panel
3 backlight
4 active matrix substrate
5, 22, 23, 24 opposite substrate (color filter substrate, touch panel substrate)
6 liquid crystal layer (electrooptical element)
10, 41 glass substrate
11 black matrix (BM, light-shielding portion)
12, 12a, 12b first electrode (first light-transmissive electrode)
13, 13a, 13b second electrode (second light-transmissive electrode)
13c relay electrode
14 first insulating layer
15 bridge wiring line (first light-shielding wiring line)
15a, 25a contact section (first contact hole)
16 second insulating layer
17 opposite electrode
21 dummy electrode (transmissive pattern)
25 first wiring line (first light-shielding wiring line)

26 second wiring line (second light-shielding wiring line)
26a contact section (second contact hole)
42 pixel electrode
90 substrate
91 driving electrode
92 detection electrode
93 cover glass
94 fingertip
95 capacitance
CF color filter

What is claimed is:

1. A capacitive touch panel substrate for use as one of a pair of substrates included in a display panel, the touch panel substrate comprising:
   a substrate;
   a black matrix formed over the substrate in a grid pattern to correspond to respective pixels;
   a plurality of first transmissive electrodes arranged over the substrate in a first direction and electrically connected to each other;
   a plurality of second transmissive electrodes arranged over the substrate in a second direction that intersects with the first direction and electrically connected to each other; and
   transmissive patterns formed between the first transmissive electrodes and the second transmissive electrodes,
   wherein edges of the first transmissive electrodes are positioned in an area coinciding with the black matrix when the touch panel substrate is viewed in a plan view,
   wherein edges of the second transmissive electrodes are positioned in an area coinciding with the black matrix when the touch panel substrate is viewed in a plan view, and
   wherein the transmissive patterns are formed such that edges of the transmissive patterns are positioned in an area coinciding with the black matrix when the touch panel substrate is viewed in a plan view, and the transmissive patterns are not electrically connected to the first transmissive electrodes or the second transmissive electrodes, and are electrically floating, wherein a transmittance of the transmissive patterns is equal to a transmittance of the first transmissive electrodes.

2. The touch panel substrate according to claim 1,
   wherein the edges of the first transmissive electrodes are formed along the black matrix when the touch panel substrate is viewed in a plan view, and
   wherein the edges of the second transmissive electrodes are formed along the black matrix when the touch panel substrate is viewed in a plan view.

3. The touch panel substrate according to claim 1, wherein the transmissive patterns, the first transmissive electrodes, and the second transmissive electrodes are formed of materials having an equal index of refraction.

4. The touch panel substrate according to claim 1, wherein the transmissive patterns, the first transmissive electrodes, and the second transmissive electrodes are formed of the same material.

5. The touch panel substrate according to claim 1, wherein one of the first transmissive electrodes and one of the second transmissive electrodes are adjacent to each other across a plurality of the transmissive patterns disposed therebetween, and the plurality of transmissive patterns are electrically insulated from each other.

6. The touch panel substrate according to claim 5, wherein the plurality of transmissive patterns are separately provided for each pixel.

7. The touch panel substrate according to claim 1, further comprising a transparent relay electrode formed in the same layer as the plurality of second transmissive electrodes,
   wherein the plurality of second transmissive electrodes are electrically connected via the relay electrode, and
   wherein the relay electrode is formed such that edges of the relay electrode are positioned in an area coinciding with the black matrix, when the touch panel substrate is viewed in a plan view.

8. The touch panel substrate according to claim 1, further comprising first light-shielding wiring lines formed in a layer different from the plurality of first transmissive electrodes,
   wherein the plurality of first transmissive electrodes are electrically connected to each other via the first light-shielding wiring lines, and
   wherein the first light-shielding wiring lines are positioned in areas coinciding with the black matrix when the touch panel substrate is viewed in a plan view.

9. The touch panel substrate according to claim 8,
   wherein a plurality of first contact holes are formed to electrically connect the first light-shielding wiring lines to the plurality of first transmissive electrodes, and
   wherein the plurality of first contact holes are positioned in an area coinciding with the black matrix when the touch panel substrate is viewed in a plan view.

10. The touch panel substrate according to claim 8, wherein the first light-shielding wiring lines are formed in a grid pattern in areas, where the first transmissive electrodes are formed, coinciding with the black matrix.

11. The touch panel substrate according to claim 7, further comprising second light-shielding wiring lines formed in a layer different from the plurality of second transmissive electrodes,
   wherein the second light-shielding wiring lines are positioned in areas coinciding with the black matrix when the touch panel substrate is viewed in a plan view,
   wherein one of the second transmissive electrodes is electrically connected to the second light-shielding wiring lines via at least two second contact holes, and
   wherein the at least two second contact holes are positioned adjacent to two relay electrodes respectively connected to the second transmissive electrodes.

12. A display panel, comprising an electrooptical element and a pair of substrates sandwiching the electrooptical element,
   wherein one of the pair of substrates is the touch panel substrate according to claim 1.

13. A display device, comprising the display panel according to claim 12.

* * * * *